US012307612B2

(12) United States Patent
Song et al.

(10) Patent No.: US 12,307,612 B2
(45) Date of Patent: May 20, 2025

(54) APPARATUS AND METHOD FOR CREATING INTELLIGENT SPECIAL EFFECTS BASED ON OBJECT RECOGNITION

(71) Applicant: INDUSTRY ACADEMY COOPERATION FOUNDATION OF SEJONG UNIVERSITY, Seoul (KR)

(72) Inventors: Oh Young Song, Seoul (KR); Soo Mi Choi, Seoul (KR); Bo Seong Kim, Seoul (KR); Jin Seong Yang, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 207 days.

(21) Appl. No.: 18/115,161

(22) Filed: Feb. 28, 2023

(65) Prior Publication Data
US 2024/0185537 A1 Jun. 6, 2024

(30) Foreign Application Priority Data
Dec. 1, 2022 (KR) .......................... 10-2022-0165636

(51) Int. Cl.
G06T 19/00 (2011.01)
G06T 19/20 (2011.01)
(Continued)

(52) U.S. Cl.
CPC ............ *G06T 19/006* (2013.01); *G06T 19/20* (2013.01); *G06V 10/26* (2022.01); *G06V 10/774* (2022.01);
(Continued)

(58) Field of Classification Search
CPC ................. G06T 19/006; G06T 19/20; G06T 2219/2016; G06V 10/26; G06V 10/774;
(Continued)

(56) References Cited

U.S. PATENT DOCUMENTS

2012/0306853 A1* 12/2012 Wright ................... G06T 19/20
345/589
2020/0020166 A1* 1/2020 Menard .................. G06V 10/82
(Continued)

FOREIGN PATENT DOCUMENTS

JP 2000-277996 A 10/2000
KR 10-1894956 B1 10/2018
(Continued)

*Primary Examiner* — Jacinta M Crawford
(74) *Attorney, Agent, or Firm* — NSIP Law

(57) ABSTRACT

An apparatus for creating intelligent special effects based on object recognition according to an example of the present disclosure includes a communication module for receiving a photographed video of an object; a memory storing a program for creating special effect information from the received video; and a processor for executing a program stored in the memory, in which the program inputs an object video acquired from a camera to an object recognition model and extracts an object image to which an attribute of each object is matched, weight information of each object is derived by inputting size information of the object image for each attribute of each object to a weight estimation model, and special effect control information mapped to each object is determined based on the weight information for each attribute of each object.

8 Claims, 41 Drawing Sheets

(51) Int. Cl.
　　　*G06V 10/26*　　　(2022.01)
　　　*G06V 10/774*　　(2022.01)
　　　*G06V 20/20*　　　(2022.01)
　　　*G06V 20/64*　　　(2022.01)

(52) U.S. Cl.
　　　CPC ............ *G06V 20/20* (2022.01); *G06V 20/647* (2022.01); *G06T 2219/2016* (2013.01)

(58) Field of Classification Search
　　　CPC ........ G06V 20/20; G06V 20/647; G06N 3/02; G06N 3/0464; G06N 3/08
　　　USPC .................................................. 345/419, 619
　　　See application file for complete search history.

(56) References Cited

U.S. PATENT DOCUMENTS

| | | | |
|---|---|---|---|
| 2020/0097076 A1 | 3/2020 | Alcaide et al. | |
| 2021/0118235 A1* | 4/2021 | Hou ....................... | G06V 20/20 |
| 2022/0036613 A1* | 2/2022 | Bonnevie .................. | G06T 5/70 |

FOREIGN PATENT DOCUMENTS

| | | |
|---|---|---|
| KR | 10-2020-0027846 A | 3/2020 |
| KR | 10-2137040 B1 | 7/2020 |
| KR | 10-2240351 B1 | 4/2021 |
| KR | 10-2021-0060595 A | 5/2021 |
| KR | 10-2324684 B1 | 11/2021 |

\* cited by examiner

| class | Train(0.8) | Test(0.2) |
|---|---|---|
| Sackpack | 572 | 143 |
| Ball | 800 | 200 |
| Bottle | 800 | 200 |
| Box | 800 | 200 |
| Chair | 800 | 200 |
| Clock | 732.8 | 183.2 |
| Coffee cup | 800 | 200 |
| Computer keyboard | 800 | 200 |
| Computer mouse | 497.6 | 124.4 |
| Couch | 800 | 200 |
| Desk | 800 | 200 |
| Hat | 800 | 200 |
| Laptop | 800 | 200 |
| Mobile phone | 800 | 200 |
| Pen | 800 | 200 |
| Plastic bag | 413.6 | 103.4 |
| Scissors | 233.6 | 58.4 |
| Table | 800 | 200 |
| Tin can | 800 | 200 |
| Toilet paper | 180.8 | 45.2 |

*FIG. 14A*

```
public bool Raycast(
    Vector2 screenPoint,
    List<ARRaycastHit> hitResults,
    TrackableType)
```

FIG. 14B(ii)
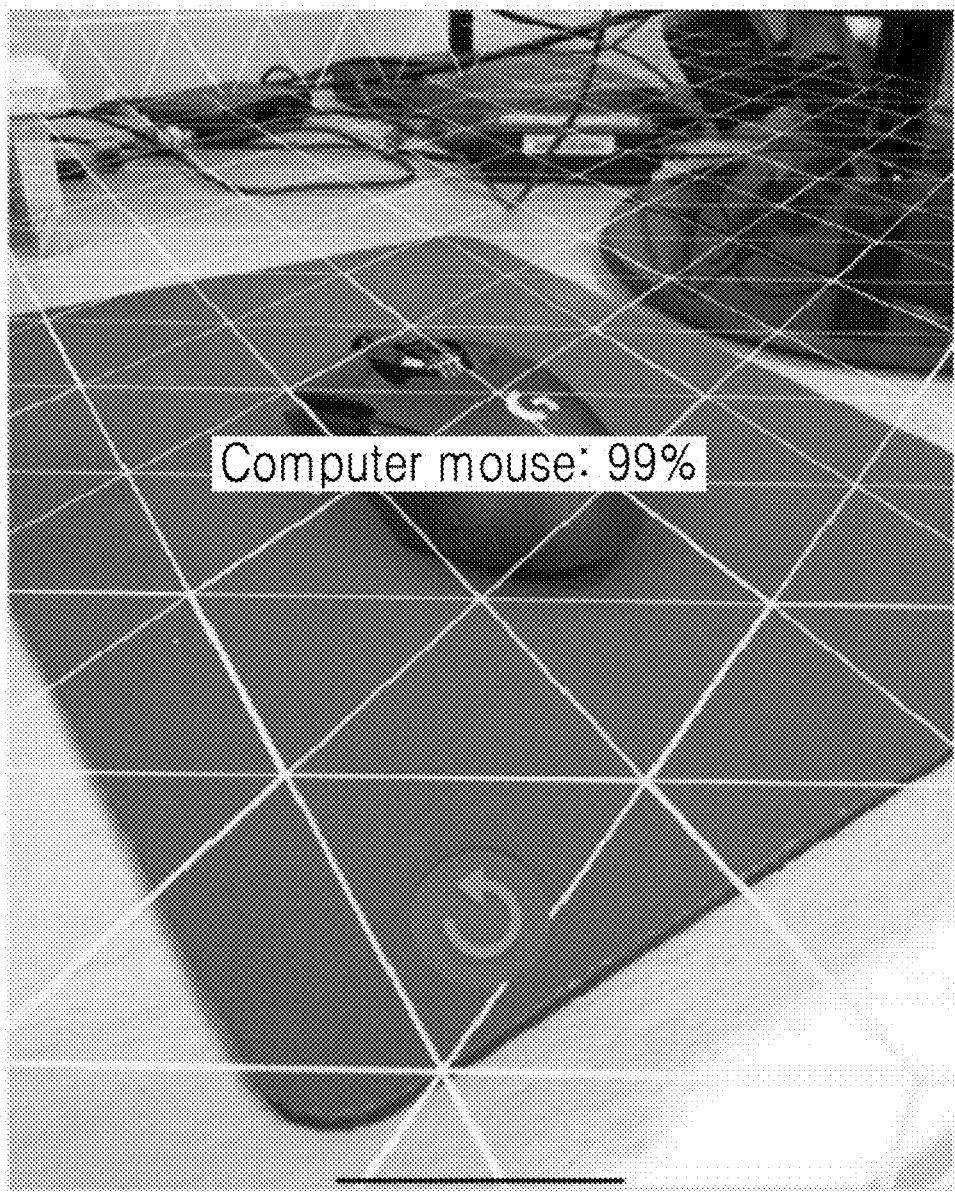

FIG. 15A

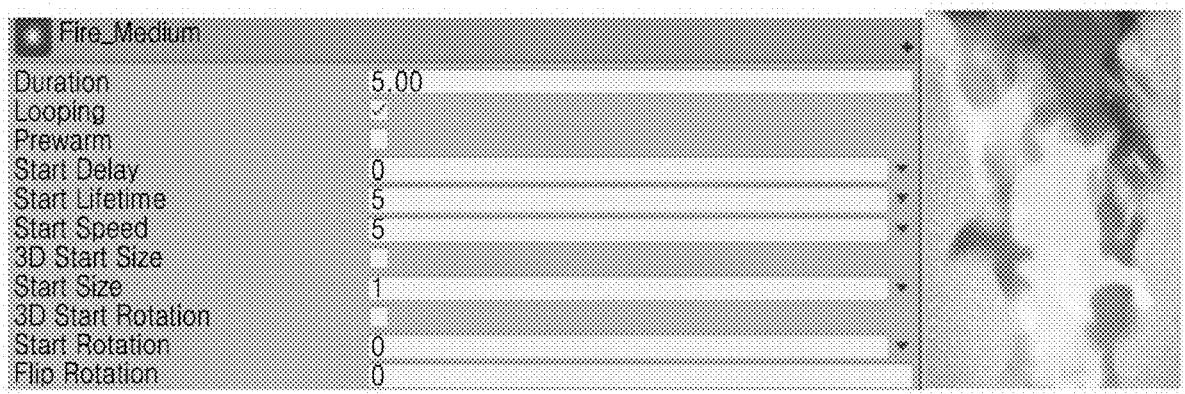

FIG. 15B

| Duration | PARTICLE SYSTEM DURATION |
|---|---|
| Looping | SET REPEAT USING |
| Start Delay | ADJUSTMENT OF SPECIAL EFFECT START TIME AFTER PARTICLE CREATION |
| Start Lifetime | PARTICLE DURATION |
| Start Speed | PARTICLE STARTING SPEED |
| 3D Start Size | SET STARTING SIZE OF PARTICLE BY SETTING X, Y, AND Z VALUES SEPARATELY |
| Start Size | SET BASICALLY OVERALL STARTING SIZE FOR PARTICLE |
| Start Rotation | SET ROTATION VALUE AT START OF PARTICLE |
| Max Particles | MAXIMUM NUMBER OF PARTICLES |

*FIG. 15C*

| Rate Over Time | SET NUMBER OF PARTICLES EMITTED PER SECOND |
|---|---|
| Rate Over Distance | SETS NUMBER OF PARTICLES TO EMIT PER DISTANCE BASED ON UNIT |
| Count | NUMBER OF PARTICLES EMITTED AT ONCE |
| Cycles | NUMBER OF PARTICLES EMITTED DURING DURATION |
| Interval | SET EMITTING INTERVAL |
| Velocity Over Lifetime | ADJUST SPEED AT WHICH PARTICLES ARE CREATED AND DISAPPEARED |
| Limit Velocity Over lifetime | LIMIT SPEED OF PARTICLES |
| Force Over Lifetime | ADJUST FORCE APPLIED DURING TIME PARTICLE IS ACTIVE |
| Collision | SET PARTICLE TO COLLIDE WITH GAME OBJECT |

*FIG. 16*

```
if(outline.Label.Equals("Coffee cup")

{
        Instatiate(firecup, hitPose.position, hitPose.rotation);
}
if(outline.Label.Equals("Bottle")

{
        Instatiate(firebottle, hitPose.position, hitPose.rotation);
}
```

APPARATUS AND METHOD FOR CREATING INTELLIGENT SPECIAL EFFECTS BASED ON OBJECT RECOGNITION

CROSS-REFERENCE TO RELATED APPLICATION

This application claims the benefit under 35 USC 119(a) of Korean Patent Application No. 10-2022-0165636, filed on Dec. 1, 2022, in the Korean Intellectual Property Office, the entire contents of which are incorporated herein by reference.

BACKGROUND

1. Field

The present disclosure relates to an apparatus and a method for creating intelligent special effects based on object recognition.

2. Description of the Related Art

In general, mixed reality (MR) refers to realistic video technology that creates a new environment or visualized new information by combining a virtual world and a real world.

In order to realize mixed reality, augmented reality (AR) technology and virtual reality (VR) technology are being researched. The augmented reality technology adds computer-created information to the reality perceived by a user, and the virtual reality technology creates an environment or situation that is similar to reality but not reality. However, there is a limitation in that the physical laws of the real world do not apply to the virtual world. In order to overcome these limitations, methods and apparatuses for creating/transforming/interacting intelligent special effects in the virtual/augmented/mixed reality environment using spatial information of perceived reality are being researched.

In this regard, there is a technology for producing realistic VR/AR content using special effects based on physical space relationships when the type and position of an object acquired in the real world is known.

The augmented reality (AR) technology replaces some of information in the real world in real time, and provides the user with the virtual content while maintaining the user experience in the real environment. However, existing technologies are limited to creation and interaction between virtual objects, and there is a limit in that real world spatial information may only be utilized on a horizontal plane of a desk for placing virtual objects.

Therefore, in order to provide intelligent special effects that may be created/transformed/interacted using the spatial information, real information recognition technology and special effect augmentation technology are required.

The recognition technology of real information is representative of a deep learning-based object detection algorithm, and is used in various fields such as road analysis of autonomous vehicles and human tracking. Existing image-based deep learning technology basically analyzes 2D images, and mixed reality is difficult to apply because it is a 3D space in which persons actually live. As such, most of the existing studies are proceeding with object recognition through 2D images.

The specific contents of the existing mixed reality technology related to this are as follows. First, there are two types of image analysis and object classification methods using neural networks: area designation and regression. For example, as the area designation method, algorithms such as R-CNN, SPP-Net, Fast R-CNN, and Faster R-CNN extract proposed areas from images using selective search and then classify images within the proposed areas. In addition, as a regression method model, YOLO predicts an object bounding box and a class name, thereby enabling fast detection. However, since a network architecture is simple, there is a limitation that a detection accuracy decreases as a frame rate increases.

Second, the augmented reality technology replaces (augments) some real objects with virtual information in real time. That is, the augmented reality technology includes a function of combining the real world and the virtual world, a function of providing virtual interaction in real time, and a function of expressing virtual information in a 3D space. That is, the augmented reality technology is being studied to implement a more natural special effect interaction in the augmented reality environment by using 3D information such as height, width, and depth of an object. For example, in the existing augmented reality technology using 3D information, there is a technology for recognizing a picture or a marker placed on an object and augmenting an effect specified thereto. The existing augmented reality technology may effectively implement visual special effects based on spatial information such as where and what objects are located and how planes are composed. However, there is a limit in that it cannot understand sudden situations other than space, such as situational determination such as what kind of object it is.

Therefore, there is a need for a technology that provides that recognition of objects through artificial intelligence by merging the advantages of the two technologies that have limitations, augmentation thereof in a 3D position through the augmented reality technology, and implementation of intelligent special effects depending on objects.

Korean Patent Registration No. 10-22403513 (Title of Invention: Apparatus for Displaying Augmented Reality Contents and Control Method Thereof)

SUMMARY

An apparatus and a method for creating intelligent special effects based on object recognition according to an example of the present disclosure provide special effects in which a user may intelligently understand a scene by combining object detection technology with augmented reality technology for knowing a depth of an image and an actual 3D position.

An apparatus for creating intelligent special effects based on object recognition according to an example of the present disclosure includes a communication module for receiving a photographed video of an object; a memory storing a program for creating special effect information from the received video; and a processor for executing a program stored in the memory, in which the program inputs an object video acquired from a camera to an object recognition model and extracts an object image to which an attribute of each object is matched, weight information of each object is derived by inputting size information of the object image for each attribute of each object to a weight estimation model, and special effect control information mapped to each object is determined based on the weight information for each attribute of each object.

A method for creating special effects by an apparatus for creating intelligent special effects based on object recognition according to another example of the present disclosure includes, the method includes (a) a step of inputting an object video acquired from a camera to an object recognition model and extracting an object image to which an attribute of each object is matched; (b) a step of inputting size information of the object image for each attribute of each object into a weight estimation model and deriving weight information of each object; and (c) a step of determining special effect control information that is mapped to each object based on weight information for each attribute of each object.

The apparatus and the method for creating intelligent special effects based on object recognition according to an example of the present disclosure may provide a more realistic mixed reality experience to the user by using an image-based deep learning technique, recognizing the object in real time, and providing a special effect for an object recognized in a 3D position through augmented reality technology.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 8 and 9 are diagrams for explaining a learning process of an object recognition model according to an example of the present disclosure;

FIG. 14A illustrates a method according to the use of the Raycast Manager class;

FIGS. 15A, 15B, 15C, and 15D illustrate a control process of special effects using Unity's Particle System;

FIG. 16 illustrates an example of a relevant code that augments different special effects according to a recognized label of an object on the coordinates of the object;

DETAILED DESCRIPTION

Figure 1:
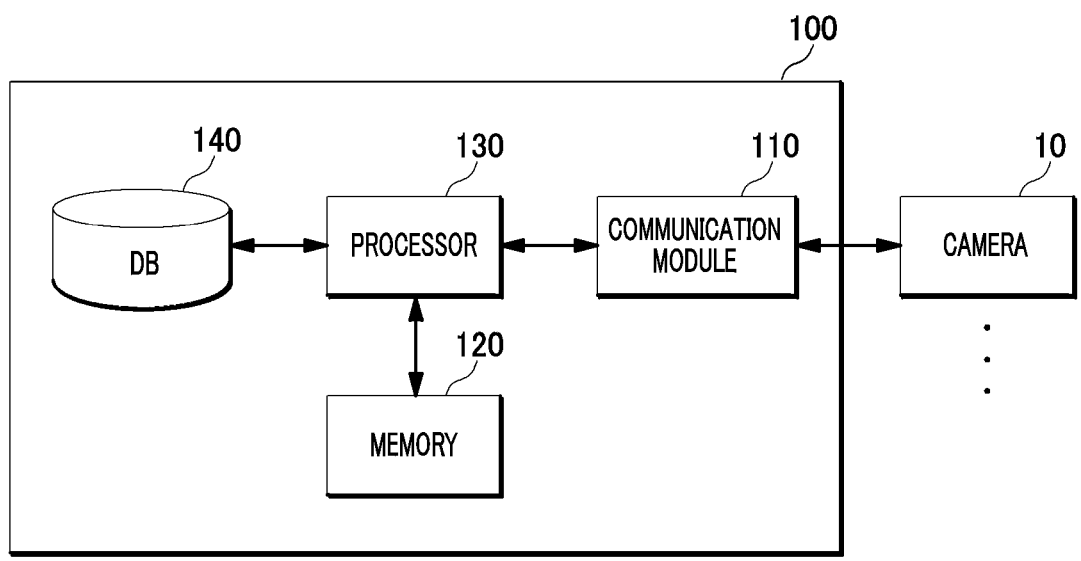
FIG. 1 is a diagram illustrating an apparatus for creating intelligent special effects based on object recognition according to an example of the present disclosure.

Hereinafter, with reference to the accompanying drawings, examples of the present disclosure will be described in detail so that those skilled in the art may easily practice these. However, the present disclosure may be embodied in many different forms and is not limited to the examples set forth herein. In addition, in order to clearly explain the present disclosure in the drawings, parts irrelevant to the description are omitted, and similar reference numerals are attached to similar parts throughout the specification.

Throughout the specification, when a part is said to be "connected" to another part, this includes a case where it is "directly connected" and a case where it is "electrically connected" with another element interposed therebetween. In addition, when a part "includes" a certain component, it means that it may further include other components without excluding other components unless otherwise stated.

In this specification, 'unit' includes a unit realized by hardware or software, or a unit realized using both, and one unit may be realized using two or more hardware, and two or more units may be implemented. The above units may be realized by one piece of hardware. Meanwhile, '~unit' is not limited to software or hardware, and '~unit' may be configured to be in an addressable storage medium or configured to reproduce one or more processors. Therefore, as an example, '~unit' refers to components such as software components, object-oriented software components, class components, and task components, processes, functions, properties, procedures, subroutines, segments of a program code, drivers, firmware, microcode, circuitry, data, databases, data structures, tables, arrays, and variables. Functions provided within components and '~units' may be combined into smaller numbers of components and '~units' or further separated into additional components and '~units'. In addition, components and '~units' may be implemented to regenerate one or more CPUs in the device.

FIG. 1 is a diagram illustrating an apparatus for creating intelligent special effects based on object recognition according to an example of the present disclosure.

Referring to FIG. 1, an object recognition based-on special effect creating apparatus 100 according to an example of the present disclosure includes a camera 10, a communication module 110, a memory 120, a processor 130, and a database 140.

The communication module 110 provides a communication interface capable of transmitting and receiving images captured by the camera 10 to the special effect creating apparatus 100 in conjunction with a communication network, and in particular, serves to transmit and receive data between a camera device and a management server. Here, the communication module 110 may be a device including hardware and software necessary for transmitting and receiving a signal such as a control signal or a data signal through a wired or wireless connection with another network device.

For example, the camera 10 is a camera module capable of capturing a 2D video, and may be mounted on a user terminal, but is not limited thereto. Also, the camera module may include a depth camera capable of measuring 3D depth data, such as a LIDAR scanner.

The memory 120 may have a program for creating special effect information recorded thereon. Also, the memory 120 may temporarily or permanently store data processed by the processor 130. Here, the memory 120 may include volatile storage media or non-volatile storage media, but the scope of the present disclosure is not limited thereto.

The memory 120 stores a program that provides a method for creating intelligent special effects based on object recognition. The memory 120 stores various kinds of data created during the execution of an operating system for driving the special effect creating apparatus 100 or a program that provides the method for creating intelligent special effects based on object recognition.

The processor 130 executes a program stored in the memory 120, and performs the following processing according to the execution of the program providing the method for creating intelligent special effects based on object recognition.

The program inputs an object video acquired from the camera to a object recognition model to extract the object image to which the attribute of each object is matched, and inputs size information of the object image for each attribute of each object to a weight estimation model to determine the weight of each object to derive the weight information of each object, and determines special effect control information mapped to each object based on the weight information for each attribute of each object.

The processor 130 may include any type of device capable of processing data. For example, it may refer to a data processing device embedded in hardware having a physically structured circuit to perform a function expressed as a code or command included in a program. As an example of such a data processing device built into hardware, a microprocessor, a central processing unit (CPU), a processor core, a multiprocessor, an application-specific integrated circuit (ASIC), a field programmable gate arrays (FPGA), etc. are provided, but the scope of the present disclosure is not limited thereto.

The database 140 may be a medium that organically combines and stores commonly required data to perform the method for creating intelligent special effects based on object recognition. The database 140 may store object videos including preset objects, object images cut to the size of a bounding box formed to fit each object, object attributes including the type, material, size or weight of each object, and learning data. Such a database may be included as a component separate from the memory 120 or may be built in a partial area of the memory 120.

Figure 2:
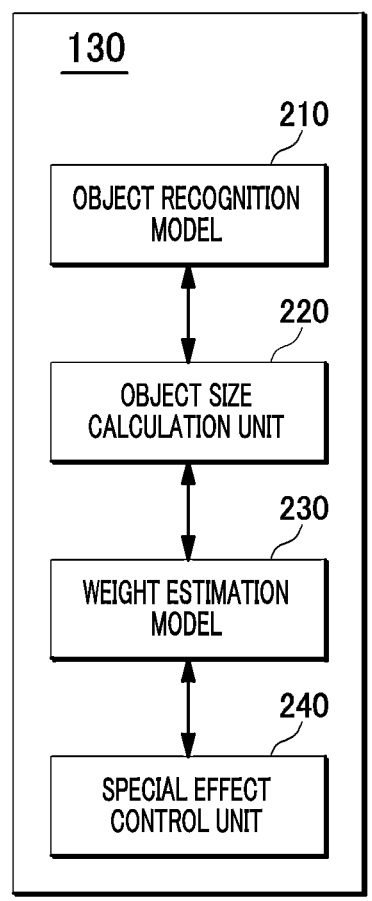
FIG. 2 is a block diagram for explaining detailed modules of the apparatus for creating intelligent special effects based on object recognition according to an example of the present disclosure.
Figure 3:
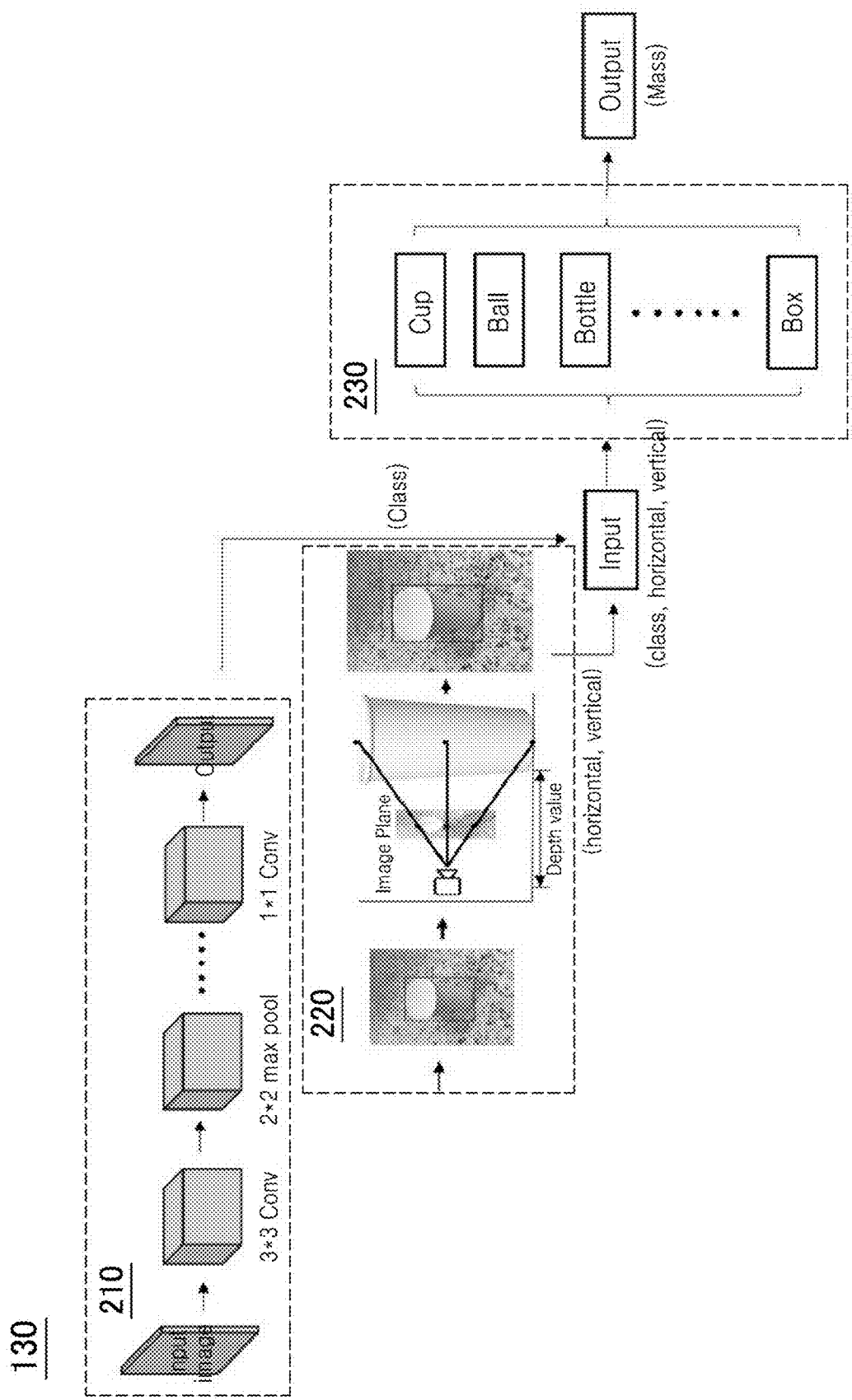
FIG. 3 is a diagram for explaining the apparatus for creating intelligent special effects based on object recognition according to an example of the present disclosure.

FIG. 2 is a block diagram for explaining detailed modules of the apparatus for creating intelligent special effects based on object recognition according to an example of the present disclosure, and FIG. 3 is a diagram for explaining the apparatus for creating intelligent special effects based on object recognition according to an example of the present disclosure.

Referring to FIG. 2, the processor 130 may include detailed modules that perform various functions according to the execution of programs stored in the memory 120. The detailed module includes an object recognition model 210, an object size calculation unit 220, a weight estimation model 230, and a special effect control unit 240.

Referring to FIG. 3, the program may input the object video acquired from the camera 10 to the object recognition model 210 to extract the object image to which the attribute of each object is matched. At this time, the attribute of each object may include the type, material, size, and weight of the object, but is not limited thereto.

Subsequently, the program may derive the weight information of each object by inputting the size information of the object image for each attribute of each object calculated through the object size calculation unit 220 to the weight estimation model 230.

Next, the program may determine special effect control information mapped to each object based on the weight information for the attribute of the each object and the depth information up to each object acquired from the depth camera through the special effect control unit 240.

Therefore, the present disclosure may provide more realistic special effects to the user by combining object detection technology with augmented reality technology capable of knowing the depth information of the image and an actual 3D position.

Hereinafter, a configuration of each module of the processor 130 will be described in detail with reference to FIGS. 3 to 6B.

As illustrated, the object recognition model 210 may be built based on training data in which each object image identified from an object video including a preset object and the attribute of each object are labeled. In addition, the object recognition model 210 may convert 2D coordinates of the object image into 3D coordinates of augmented reality by learning the depth information to each object acquired from the depth camera through transfer learning. In this case, each object image may be an image cut to a size of a bounding box formed to fit each object.

Accordingly, the object recognition model 210 may extract an object image to which the attribute of each object is matched when the object video acquired from the camera 10 is input. For example, the object image (bounding box) may be stored in the database 140 after being matched to the type of the object, the material of the object, the size of the object, or the weight of the object which is described later, as the attributes of each object.

Exemplarily, the types of the object may be classified as target objects to be recognized from the object recognition model 210 such as cup, ball, whiteboard, can, laptop, bottle, chair, keyboard, mouse, clock, mobile phone, bag, box, toilet paper, flower pot, doorknob, sofa, stair, trash can, book, microwave oven, towel, spoon, printer, picture frame, dumbbell, chest of drawer, table, camera, and refrigerator. In addition, the material of the object may include an object by material classified in a cup category including ceramic cup, paper cup, glass cup, etc., an object by material classified in a ball category including baseball, soccer ball, tennis ball, golf ball, etc., an object by material classified in a bottle category including plastic bottle, glass bottle, etc.

In addition, since the object image uses 2D image-based coordinates through the screen of the user terminal, the exact 3D coordinates of the object may be identified through transfer learning based on the depth information measured from the depth camera included in the user terminal. At this time, a detailed learning process of the object recognition model 210 through the transfer learning will be described later with reference to FIGS. 8 and 9.

Figure 4:
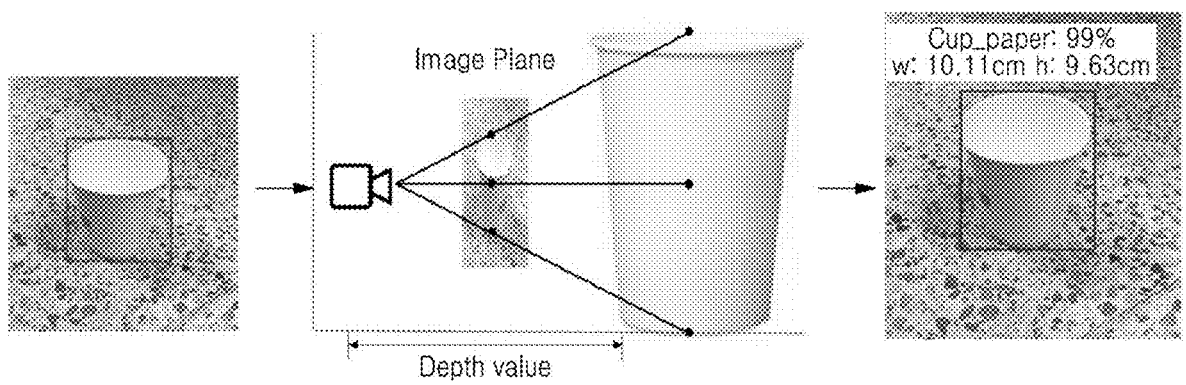
FIG. 4 is a diagram for explaining an object size calculation unit according to an example of the present disclosure.

FIG. 4 is a diagram for explaining the object size calculation unit according to an example of the present disclosure.

Referring to FIG. 4, the object size calculation unit 220 calculates size information of a view frustum based on the depth information up to each object, and it is possible to calculate actual horizontal and vertical length information of each object based on the size information of the view frustum and the size information of the object image (bounding box).

That is, the size of the bounding box (object image) may correspond to the actual size of the object.

Exemplarily, the object size calculation unit 220 may calculate the actual size of the recognized object by comparing the depth information up to each object and the size of the bounding box with a size ratio of the view frustum. In geometry, for example, a frustum refers to one that cuts through a solid or a part between two parallel planes thereof. In computer graphics, the view frustum is a 3D area that may be viewed on the screen and refers to a 3D volume within a scene disposed relative to a camera in a viewport. That is, as illustrated in FIG. 4, if the depth information from the depth camera to the object (target) is known, the size of the view frustum defined as a rectangle in the 3D space may be known. Here, the size of the view frustum refers to the actual size of the real world illustrated on the screen. An angle created when the line connecting upper and lower midpoints of the screen is extended from the center of the perspective refers to Field of View (FoV). The program defines the angle of view of the view frustum as the FoV at the point where it collides with the object through a 3D rendering program such as Raycast, and may calculate the actual size of the view frustum by combining it with the depth information of the object.

The object size calculation unit 220 may obtain the screen size (size of the screen), the screen size corresponds to the actual size of the view frustum, and may obtain the actual size of the object according to Equation 1.

$$\text{Actual size of object} = \frac{\text{Size of bounding box} \times \text{Size of view frustum}}{\text{Size of screen}} \quad \text{<Equation 1>}$$

Thereafter, the program maps the depth information z of each object obtained from the depth camera to the 2D coordinates x, y of the real object extracted from the object recognition model 210 to determine the coordinates of each object in the 3D space, and thereby it is possible to perform interaction between each object and augmented reality based thereon.

In addition, the program may derive weight information of each object through the weight estimation model 230, and determine special effect control information mapped to each object based on the weight information for each object attribute through the special effect control unit 240.

Exemplarily, in the weight estimation model 230, a multiple regression model may be constructed for each attribute of each object so that the weight information of each object is output by taking actual horizontal and vertical length information of each object as an input.

Exemplarily, the weight estimation model 230 may create a multiple linear regression model for each class (type of object), execute the relevant regression model according to Equation 2 depending on the recognized class information, and obtain a weight value.

$$\hat{Y} = \hat{\beta}_0 + \hat{\beta}_1 X_1 + \hat{\beta}_2 X_2 \quad \text{<Equation 2>}$$

Here, $\hat{Y}$ is the weight, X1 is the vertical, X2 is the horizontal, $\hat{\beta}_0$ is the degree of translation of the regression line of the relevant equation, $\hat{\beta}_1$ is the degree of influence of weight Y according to the vertical length, and $\hat{\beta}_2$ is a regression coefficient that refers to the degree of influence of weight Y according to the horizontal length. In the relevant equation, the weight value may be determined based on weight learning data according to the size of the object for each type of object.

Exemplarily, the special effect control unit 240 may control the special effect control information so that the size, intensity, and duration of the fire special effect increase as the weight information for each attribute of each object increases.

FIGS. 5A to 6B are diagrams illustrating an example of a user interface according to an example of the present disclosure.

Figure 5A:
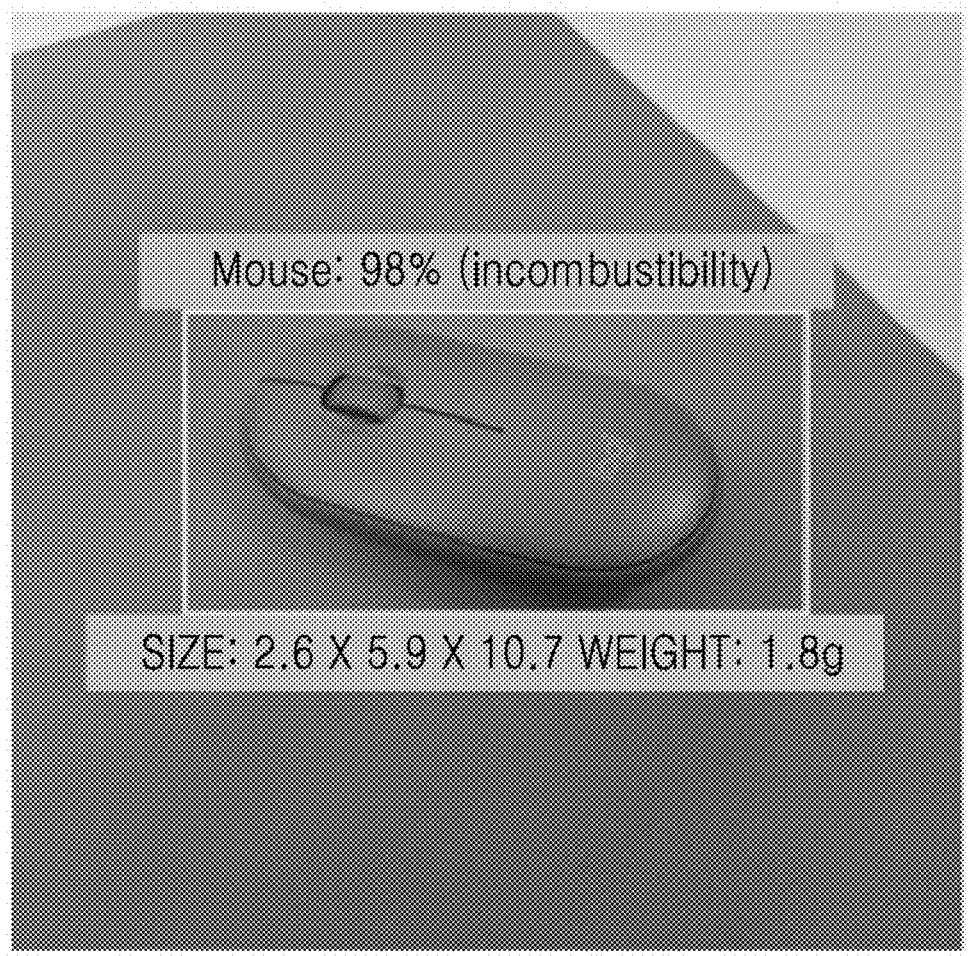
FIGS. 5A, 5B and 5C are diagrams illustrating an example of a user interface according to an example of the present disclosure.
Figure 5B:
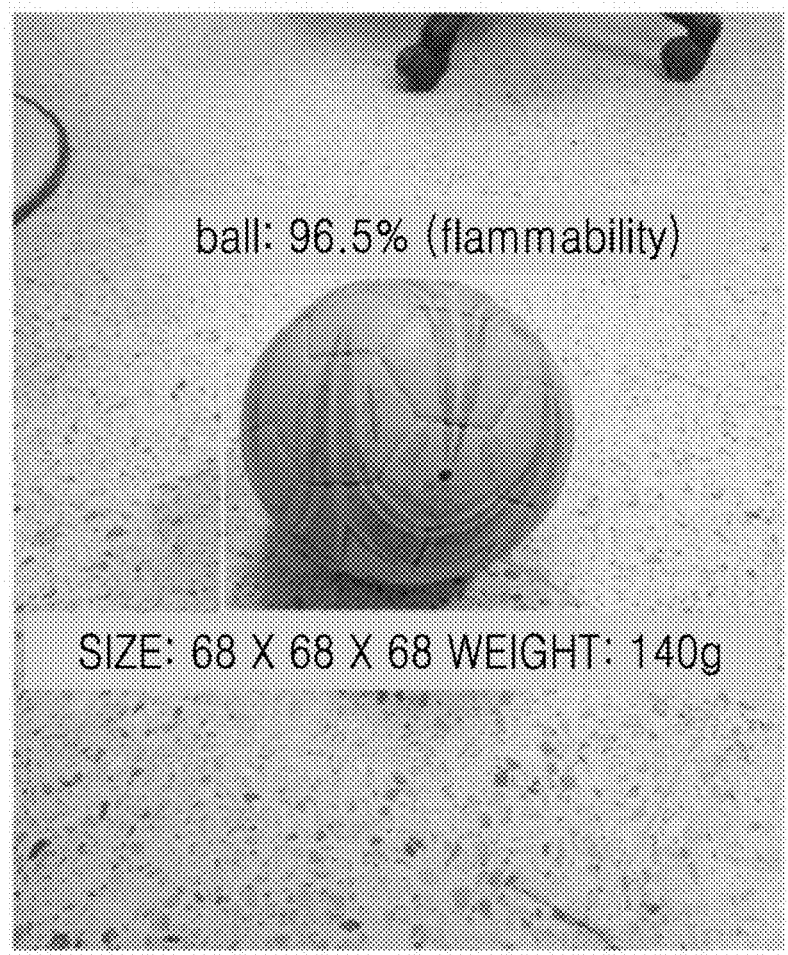
Figure 5C:
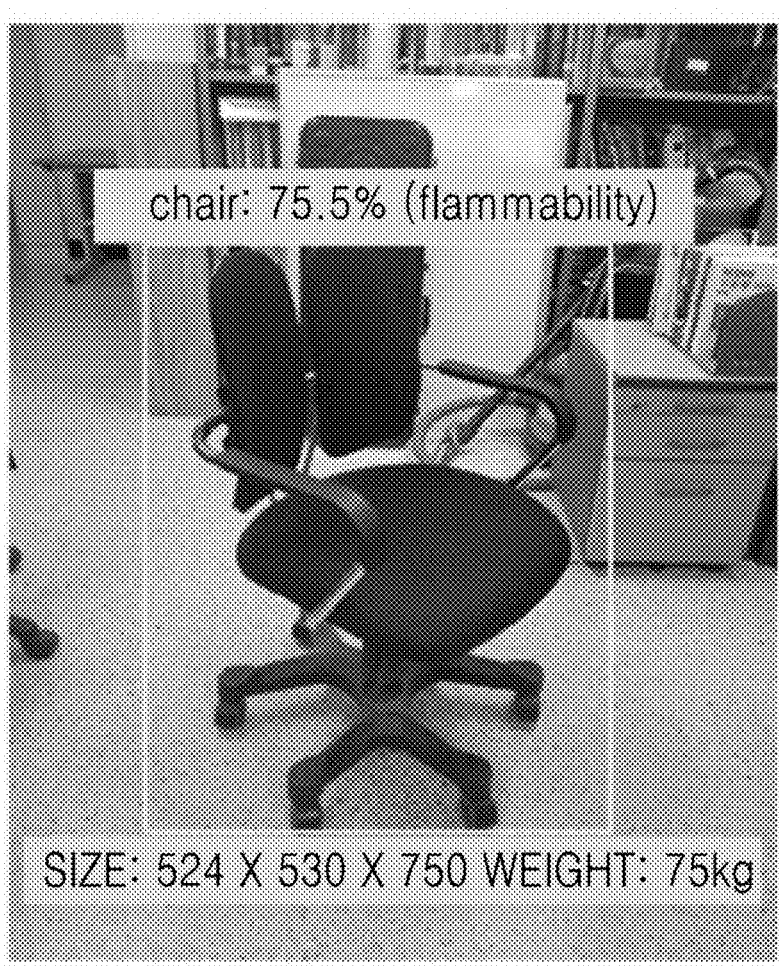

Referring to FIGS. 5A to 5C, when the object image is extracted by receiving the object video received from the camera in real time, the program may provide determines the bounding box corresponding to each object and the attribute including type, material, weight, and size of the object matched to each object through the user interface 310.

Figure 6A:
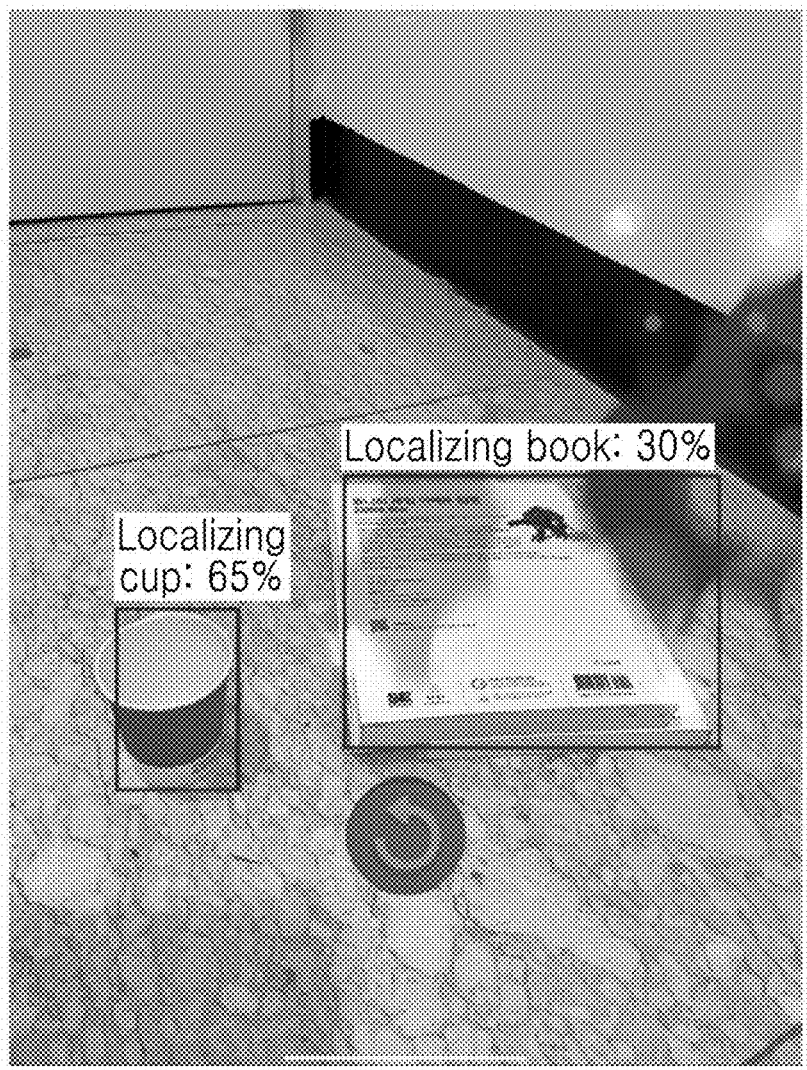
FIGS. 6A and 6B are diagrams illustrating an example of a user interface according to an example of the present disclosure.
Figure 6B:
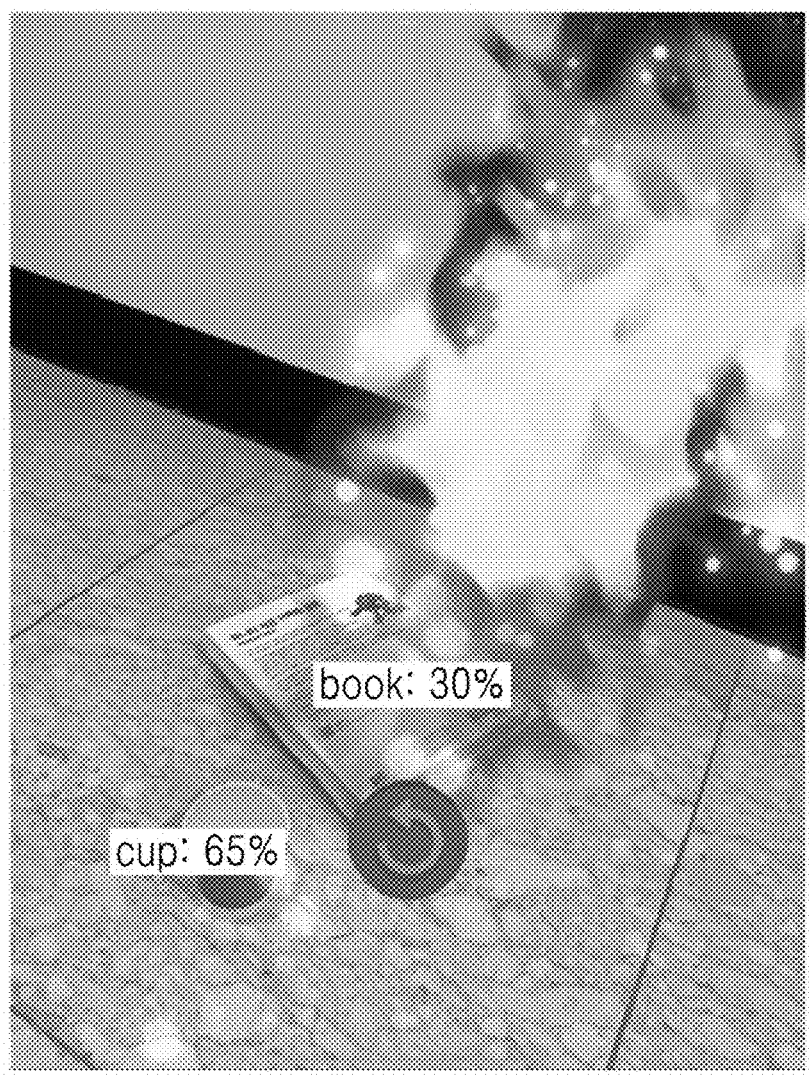

FIGS. 6A and 6B illustrate a case where the special effect control information is set to the fire effect. The program may map the size, intensity, and duration of the fire effect according to the types of objects of paper cup and book detected as the attributes of each object, the paper material, the size of the bounding box of each object, and the weight of the object. For example, FIG. 6A illustrates the onset of firing in the book, and FIG. 6B illustrates an increase in size, intensity, and duration of the fire effect in the book over time. At this time, the weight of the book may refer to an amount of fuel that determines the burning time of the book (duration of the fire effect), the size of fire, and the intensity of fire.

Hereinafter, descriptions of configuration performing the same function among the configurations illustrated in FIGS. 1 to 6B will be omitted.

Figure 7:
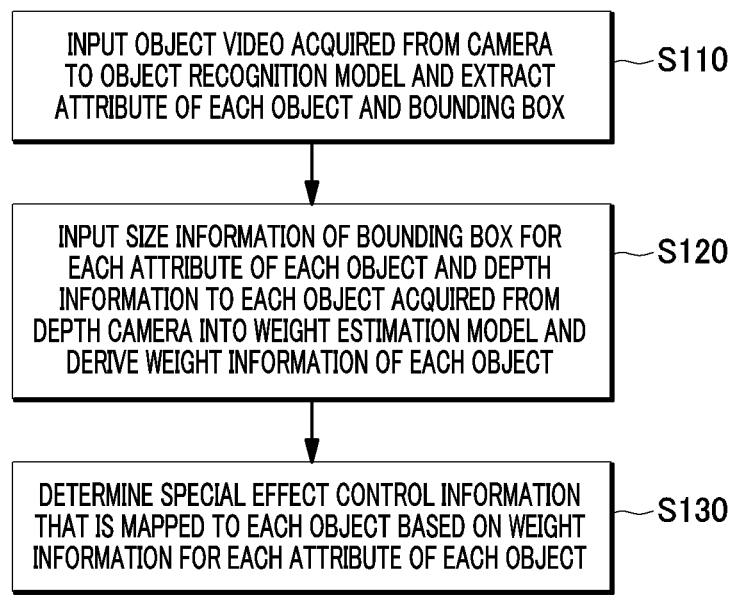
FIG. 7 is a flowchart for explaining a method for creating intelligent special effects based on object recognition according to another example of the present disclosure.

FIG. 7 is a flowchart for explaining a method for creating intelligent special effects based on object recognition according to another example of the present disclosure.

Referring to FIG. 7, the method for creating special effects by the apparatus for creating intelligent special effects based on object recognition of the present disclosure includes step S110 of inputting an object video acquired from a camera to an object recognition model and extracting an object image to which an attribute of each object is matched, step S120 of inputting the size information of the object image for each attribute of each object into the weight estimation model and deriving the weight information of each object, and step S130 of determining the special effect control information that is mapped to each object based on the weight information for each attribute of each object.

Hereinafter, with reference to FIGS. 7 to 21B, examples of the apparatus for creating special effects of a structure according to the present disclosure and experimental verification results will be described.

Figure 8:
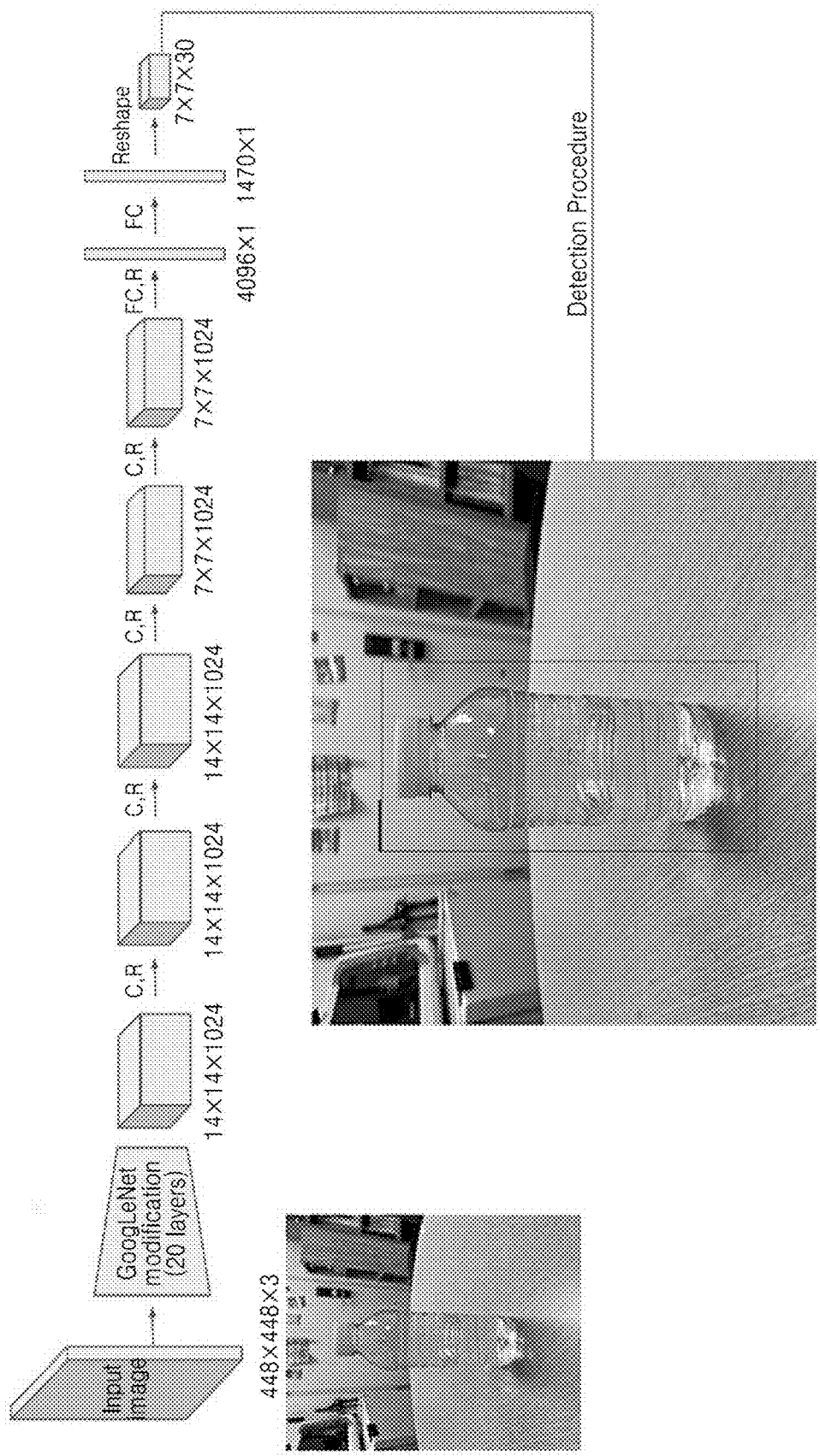

FIGS. 8 and 9 are diagrams for explaining a learning process of an object recognition model according to an example of the present disclosure.

First, since frame rate per second (FPS) in real-time object recognition may reach 45 FPS, the YOLO model is suitable for real-time image analysis. The YOLO model may predict the object bounding box and the class name by using a regression method instead of an area designation method where FPS drops significantly. Therefore, the object recognition model 210 according to an example of the present disclosure may apply the YOLO model as real-time object recognition is required in the augmented reality.

The YOLO model may directly return the image coordinates of the bounding box and the label of the relevant class by inputting the entire image to the network. In particular, since YOLOv3 is capable of predicting a larger scale than previous creations, a YOLOv3 deep neural network among the YOLO models may be applied to the object recognition model 210. For example, in the YOLOv3 deep neural network, each input image is downsampled by 32, 16, and 8, respectively, and image detection is first performed on the 82nd layer after the original inputs of the previous 81 layers are downsampled. Thereafter, a feature map is created in the 106th layer and final image detection is performed. At the level of tensor procedures, the YOLOv3 network divides the input image into grids of S×S cells, each cell serves to predict the bounding box B and the class probability C of potential entities whose centers lie inside the grid cells. Each bounding box has 4 bounding box coordinates and 5 attributes of an object reliability score, and based thereon, the final object detection and reliability are analyzed.

Also, the object recognition model 210 may include a transfer learning model for physical object recognition. That is, the transfer learning model needs a framework for implementation in a mixed reality environment. For implementation of the augmented reality and later virtual reality environment, the present disclosure may utilize a game engine. The game engine used in the present disclosure supports the development and build of most mixed reality environment including the augmented reality and the virtual reality.

FIG. 8 illustrates a data set change through a filter value change of the FC layer. As illustrated, the object recognition model 210 may perform object recognition for a desired object by changing the data set by changing the filter value of the FC layer of the YOLOv3 model through replacement of ONNX through the transfer learning.

Therefore, the present disclosure may designate a narrow target for a desired range to recognize the object faster than an existing learning model such as COCO and improve the performance of the learning model.

In the present disclosure, by using YOLOv3-tiny, physical object learning was conducted targeting 20 objects in progress such as box, bottle, and cup that may be easily seen in school, office, and laboratory.

FIG. 9 illustrates transfer learning results of 20 objects through the YOLOv3-tiny. The conversion method to ONNX used OpenVINO. The OpenVINO is a free toolkit that may optimize deep learning models on Intel hard drives using an inference engine, and it was used to convert the custom model to the ONNX. As illustrated, the object recognition model 210 created models through transfer learning using 700 data sets per object, and used to measure Mean Average Precision (mAP) using 200 data per object.

Next, object recognition of the object recognition model 210 may be applied in the actual augmented reality through the special effect control unit 240. Implementation in the augmented reality utilized an existing game engine that may use real-time 2D images for 3D augmented reality scenes using its own model. Such a game engine may input the object image extracted from the object recognition model 210 in real time, group bounding boxes indicating the same object per frame, select the box with the highest inference reliability score, and apply the location (localization).

Figure 10A:
FIGS. 10A and 10B illustrate application of the object recognition model in augmented reality through an existing game engine.
Figure 10B:

FIGS. 10A and 10B illustrate application of the object recognition model in augmented reality through an existing game engine. As illustrated, the object recognition model 210 is capable of recognizing a desired object in the augmented reality through the application of customized ONNX.

Figure 11A:
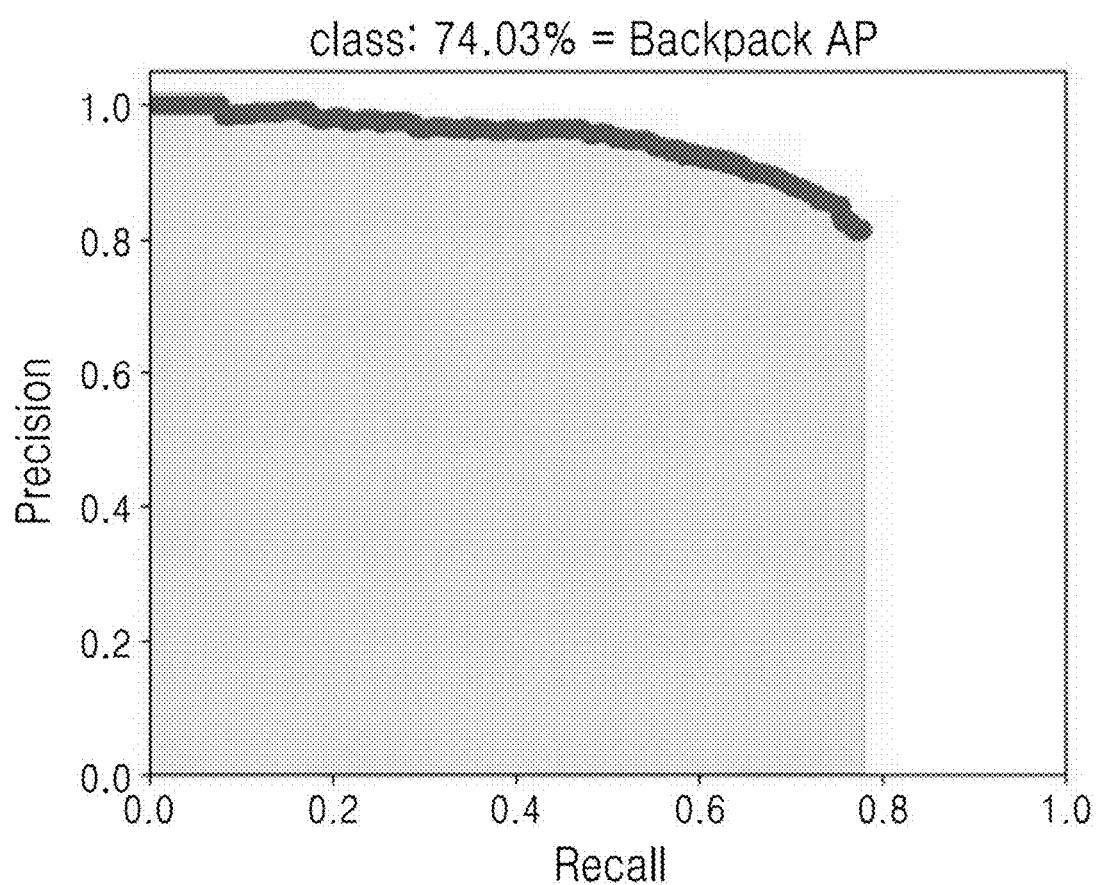
FIGS. 11A, 11B, 11C, and 11D illustrate accuracy measurement results for object recognition of an object recognition model of the present disclosure.
Figure 11B:
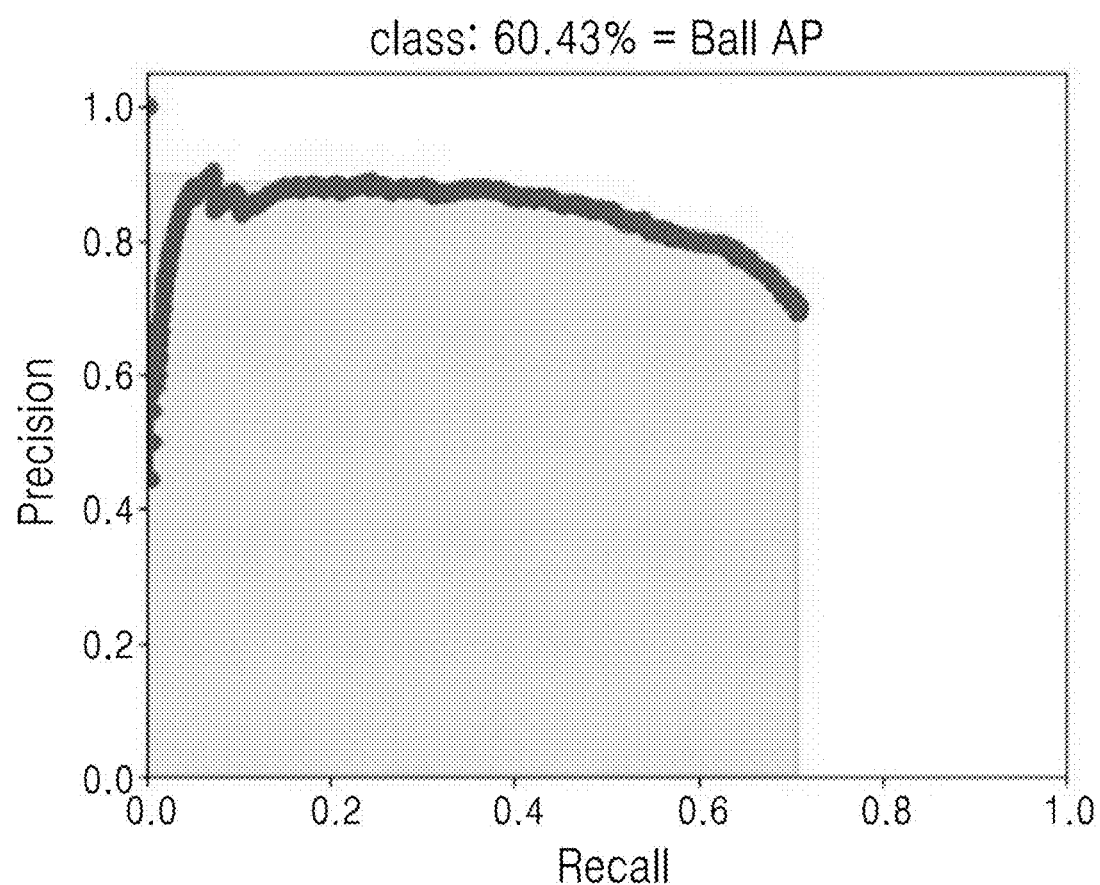
Figure 11C:
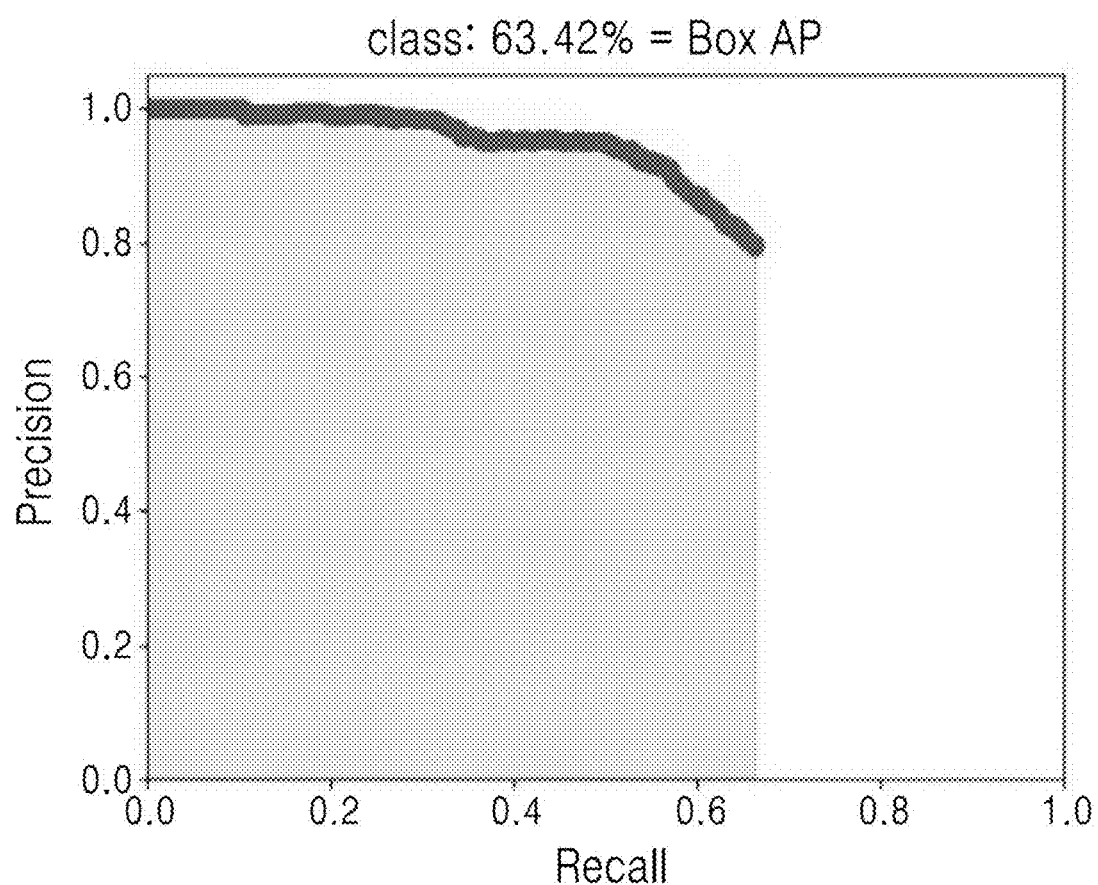
Figure 11D:
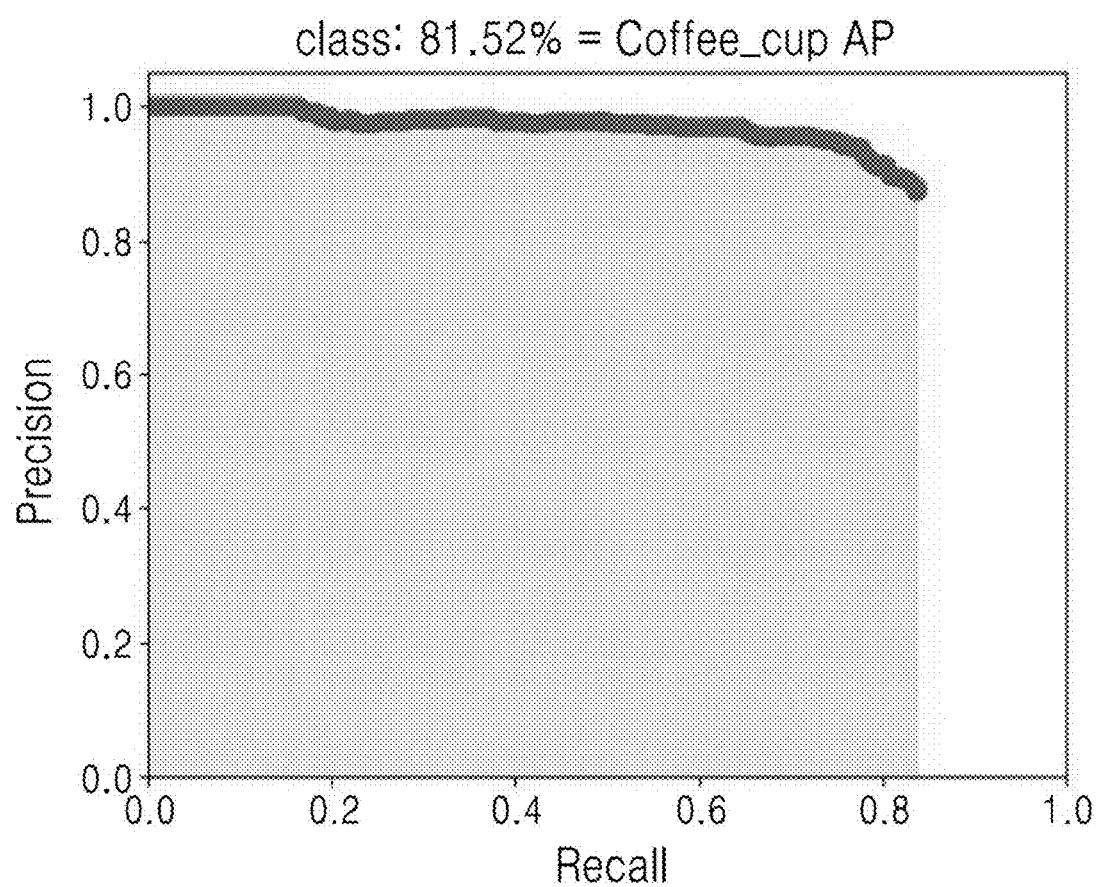
Figure 12:
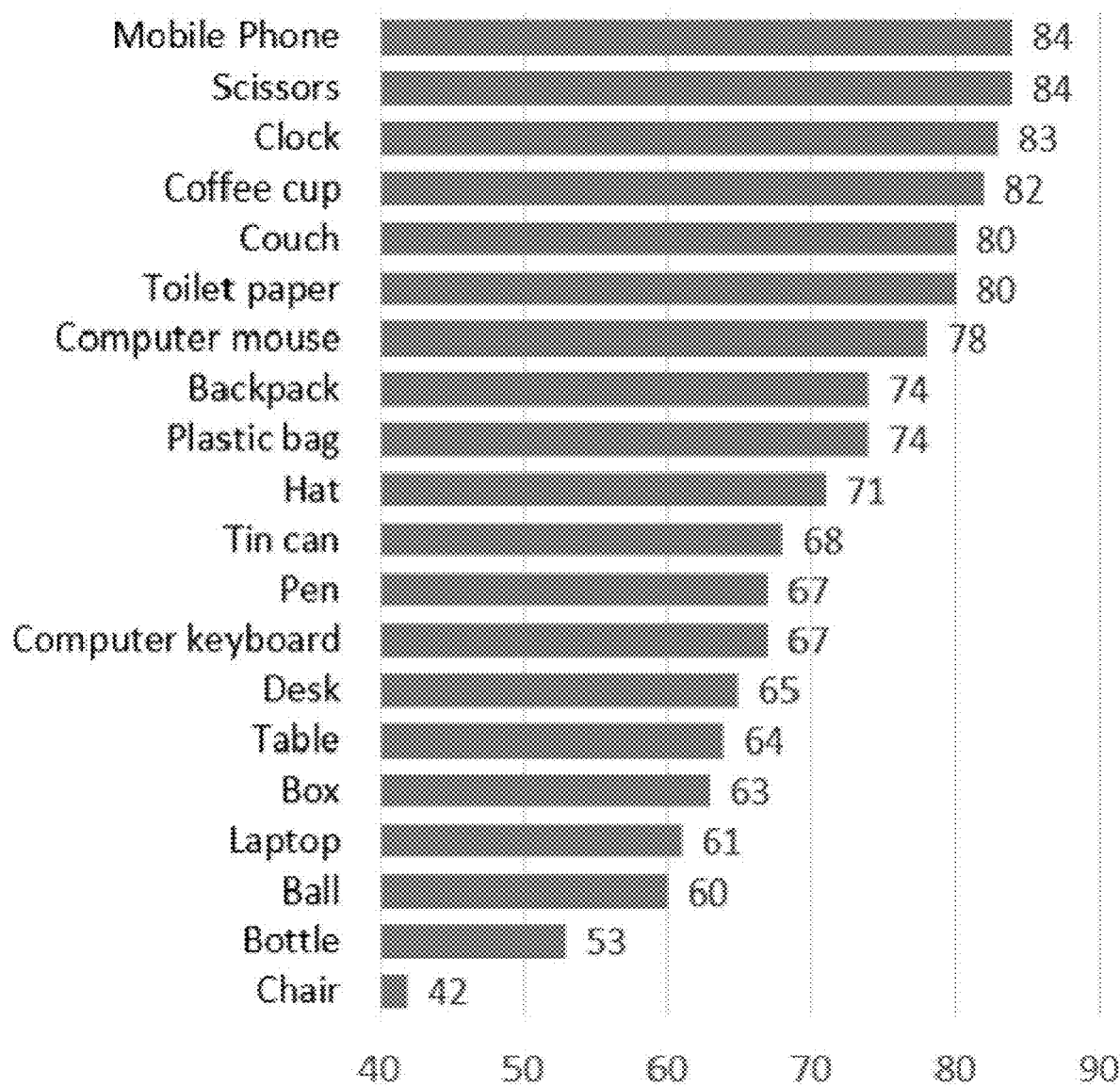
FIG. 12 illustrates accuracy measurement results for object recognition of an object recognition model of the present disclosure.

FIGS. 11A to 12 illustrate accuracy measurement results for object recognition of the object recognition model of the present disclosure. As illustrated, unlike the existing datasets that measure classification performance models, the datasets are selected only for sharp images to yield slightly higher mAP values. When the accuracy was measured, a result value of 70 mAP was derived.

In addition, it was confirmed that the object recognition speed of the object recognition model 210 is also significantly faster than that of the existing COCO model. When recognition of the same object started, the bounding box creation speed was 1.80 ms, which was significantly reduced from 3.72 ms of the existing model, and the time taken from the start of the bounding box creation to applying the box with the highest reliability was 2.57 s, which appeared to exceed 3.16 s of the existing model (Average of 20 measurements based on a computer mouse with the same object as the COCO model).

The present disclosure is based on a 2D image, and it is necessary to know the depth value for augmentation in the augmented reality environment. That is, the object recognition model 210 may convert the 2D coordinates of the object image into the 3D coordinates of the augmented reality by performing transfer learning on the object image acquired through the camera and the depth information of each object obtained from the depth camera. Exemplarily, through an existing game engine, target coordinates on a 2D screen may be augmented in a recognized 3D space.

The program of the present disclosure may determine the position where the ray (defined as the origin and direction) intersects the target to be tracked by using a 3D rendering program which may also be referred to as hit testing. Here, since the X and Y values in the 2D image of the object may be known, if an intersection point with an object that may be tracked that has already been implemented in the 3D augmented reality is obtained, the depth value Z may be accurately targeted.

For example, trackable types include a plane, a point cloud, an AR face, and the like. Among them, for convenience, in a case where all trackable types overlap, it is possible to hit the point where the specified x, y coordinate values intersect. For example, objects that are mainly tracked include flat surfaces, especially horizontal planes such as floors and desks on which objects may be placed naturally.

Figure 13A:
FIGS. 13A and 13B illustrate planes tracked through the game engine.
Figure 13B:
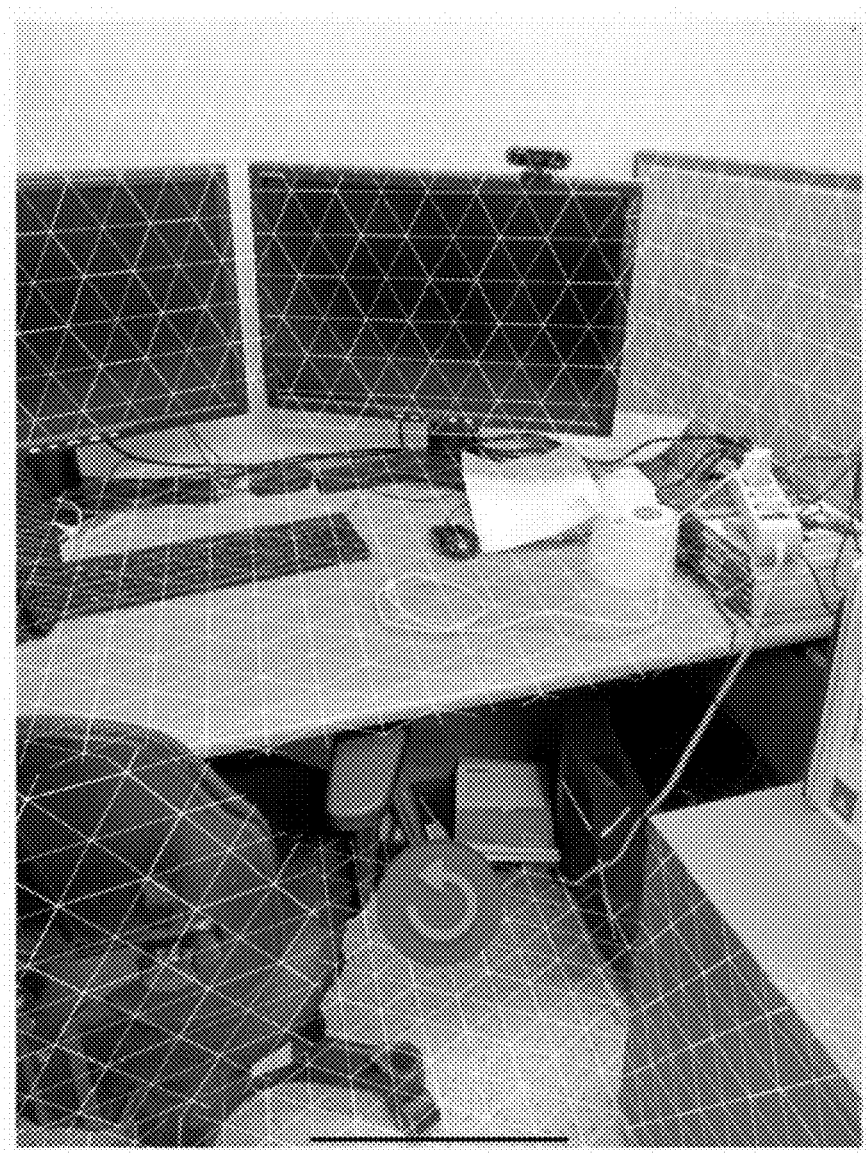

FIGS. 13A and 13B illustrate planes tracked through the game engine. In order to confirm whether the plane is well recognized, plane visualization is illustrated, and the plane confirmed through this is illustrated as the right side of FIG. 13B.

In this case, the plane is tracked according to the targeted platform, and in the case of a user terminal equipped with a LIDAR scanner, the depth may be recognized immediately without additional calculation, so the plane may be recognized very quickly. All of these planes have now become trackable targets in the augmented reality (trackable type), and if X and Y coordinates on the screen are specified, it is possible to directly augment the overlapping 3D objects (planes).

Figure 14B:
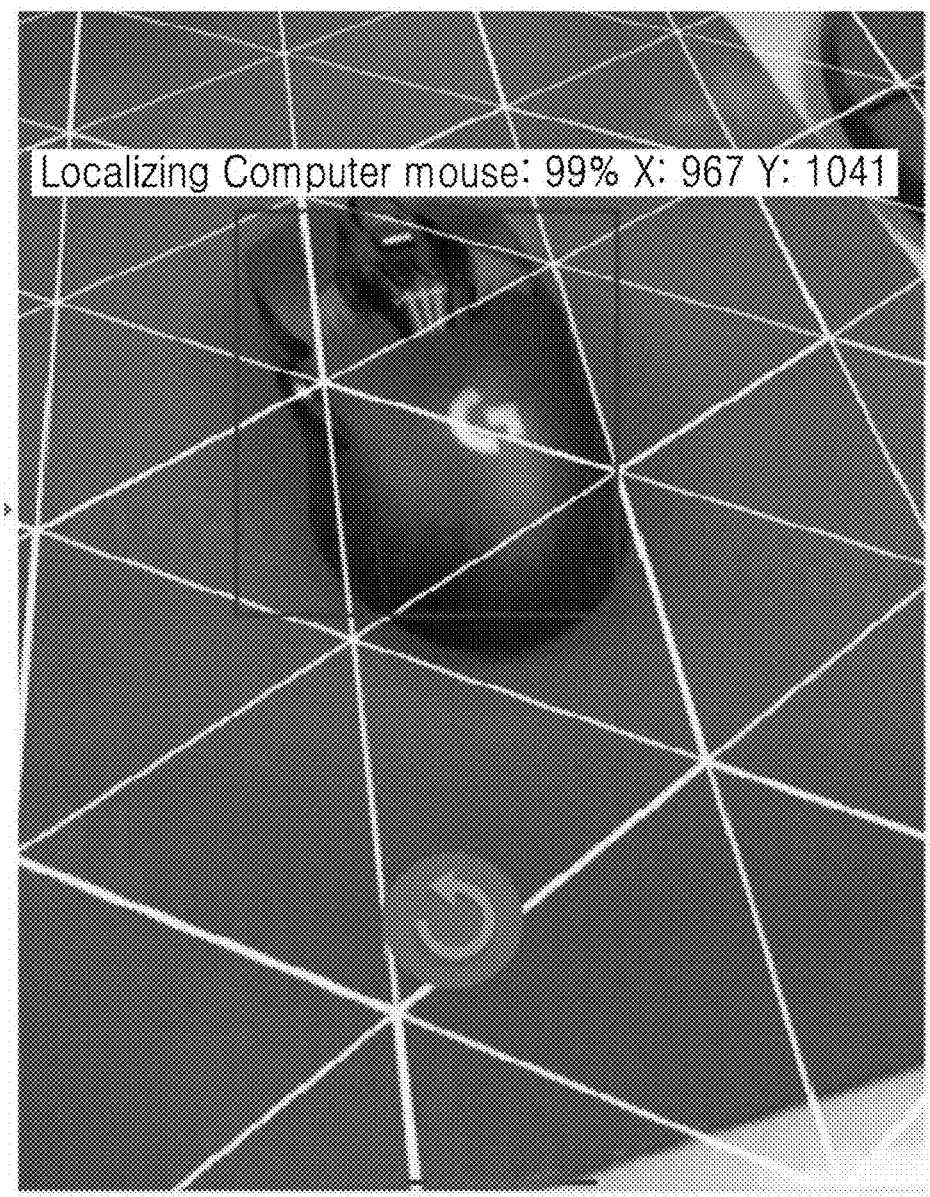
FIGS. 14B(i) and 14B(ii) illustrate conversion of 2D coordinates of transfer learning to 3D coordinates in augmented reality.

FIG. 14A illustrates a method according to the use of a class of a 3D rendering program, and FIGS. 14B(i) and 14B(ii) illustrate conversion of 2D coordinates of transfer learning to 3D coordinates in the augmented reality.

A method according to an example of the present disclosure is single raycast which is illustrated as illustrated in FIG. 14A.

As illustrated in FIG. 14A, screenPoint in Vector2 format is designated x and y values on the screen, hitResults is whether the trackable target (plane) and designated coordinates overlap, and TrackableType is the range selection of the trackable target. Object recognition that has completed transfer learning returns three values of X coordinate value/Y coordinate value/Label name. If Raycast is used for the X coordinate value and the Y coordinate value among them, it is possible to move to coordinates on the augmented reality including depth (illustrated in FIGS. 14B(i) and 14B(ii)).

Through this, the program may recognize what kind of object the relevant object is, and since it knows the exact coordinate values in the augmented reality, it is possible to interact with the special effect object through the special effect control unit 240.

FIGS. 15A to 15D illustrate a control process of special effects using a game engine.

As illustrated, the special effect control unit 240 according to an example of the present disclosure may set special effect control information using the game engine.

Exemplarily, the game engine includes various special effects that are realistically implemented. For example, special effect objects have various effects such as moving liquid, smoke, cloud, and flame, and the game engine provides a function capable of simulating these special effects. That is, the special effect control unit 240 of the present disclosure may express other special effects according to objects and situations recognized through the existing game engine.

As illustrated in FIG. 15A, the special effect control unit 240 may simply implement basic adjustment of physical properties (physical properties such as size and speed) of special effects and visual effects by using the game engine. For example, the special effect control unit 240 may arbitrarily adjust the intensity of fire to implement special effects of the augmented reality.

In addition, the special effect control unit 240 may adjust various values included in the property and the module of the special effect in addition to effects applicable to the object of the special effect, such as material. Representative property values that may be commonly adjusted are as illustrated in FIG. 15B, and module values are as illustrated in FIG. 15C.

In addition, in order to implement the special effect in augmented reality, information from the augmented reality has to be called and the special effect has to be placed in an appropriate position. If it is implemented without thinking about the location, it is different from reality and realistic expression is impossible. To this end, the special effect may be instantiated on a recognized horizontal plane.

In consideration of this, the special effect control unit 240 may create special effect objects on a horizontal plane capable of recognizing the floor of the plane, and may appear the objects as if they are on the floor due to gravity.

Figure 15D:

FIG. 15D illustrates the creation of the special effect on the horizontal plane of AR. As illustrated, if the fire special effect is created on the horizontal plane and built, it is possible to obtain a realistic effect expression as if fire occurred at the recognized object position.

That is, when the program detects the position of the recognized object, the relevant object may interact with the special effect object in the augmented reality through the special effect control unit 240. As illustrated, when the object is recognized, the fire special effect created on the plane is placed on the relevant coordinates, so that it is possible to produce a burning object.

In order to implement such an intelligent special effect, the present disclosure may use a label, which is one of the three return values of transfer learning, to implement different special effects according to objects. The label is a recognized name of the object, and through this, since the type of object may be classified, different special effects may be implemented. Exemplarily, as illustrated in FIG. 16 to be described later, paper cup and bottle may be applied.

FIG. 16 illustrates an example of a relevant code that augments different special effects according to the recognized label of the object on the coordinates of the object, and FIG. 17 illustrates an example in which special effects having different sizes are displayed according to the object attributes.

As illustrated in FIG. 16, the relevant code augments different special effects according to the recognized label of the object on the coordinates of the object. The outline. Label is a label of the returned object for which transfer learning has been completed. Through the free size application of the outline. Label, the size of the flame in the cup was set to be small and the size thereof in the bottle was set to be large. The results of executing the special effect control information set in this way are the same as those illustrated in FIGS. 17A to 17C.

Figure 17A:
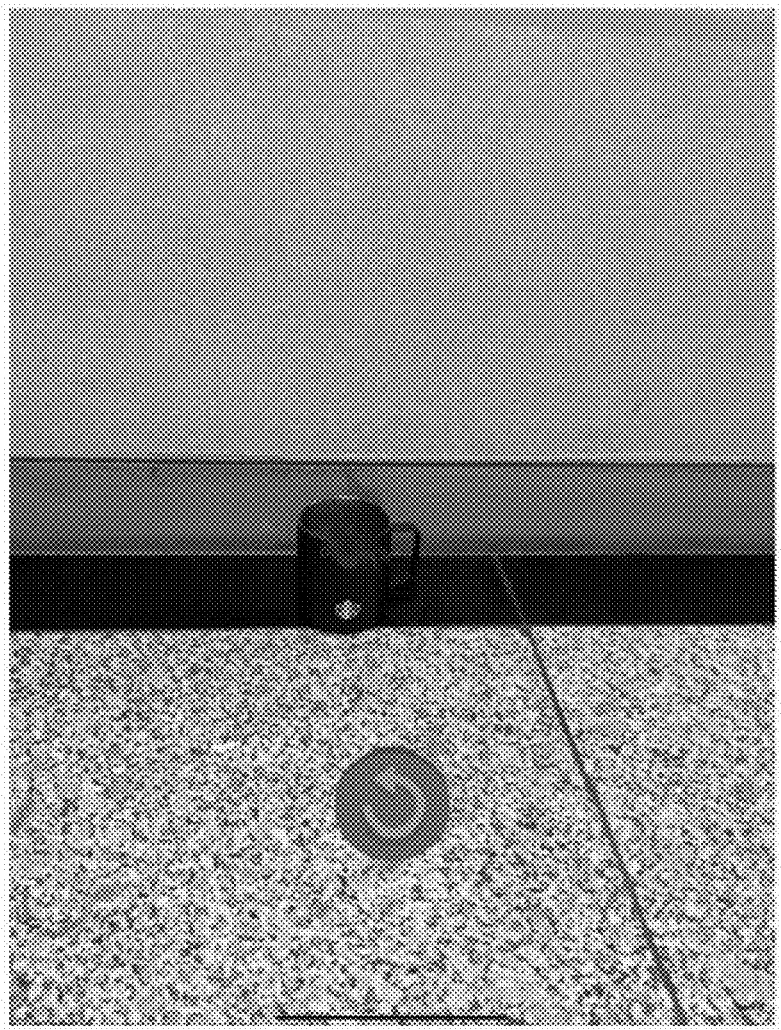
FIGS. 17A, 17B, and 17C illustrate an example in which special effects having different sizes are displayed according to object attributes.
Figure 17B:
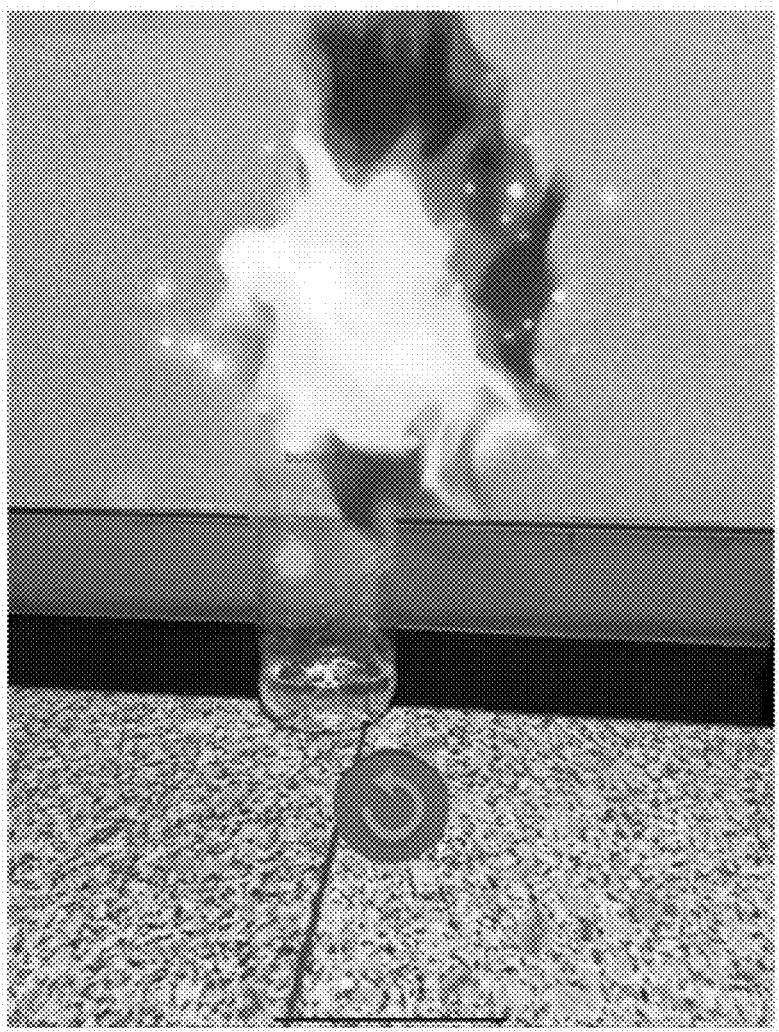
Figure 17C:
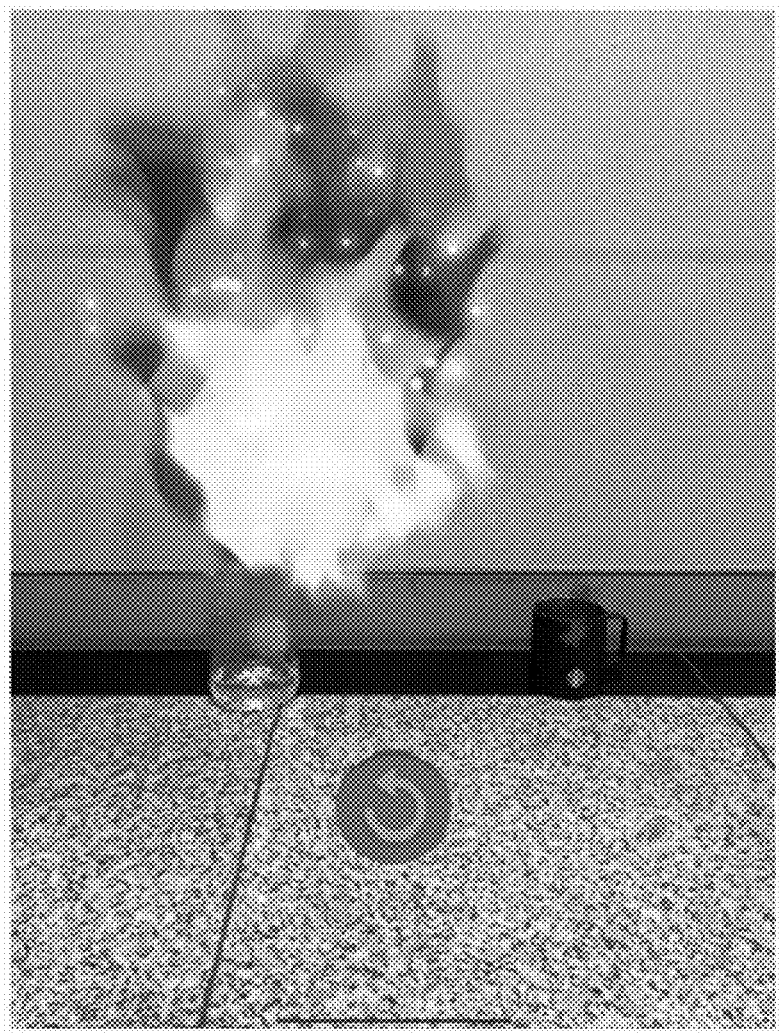

For example, FIG. 17A illustrates a small flame augmented when the type of object is recognized as the cup, FIG. 17B illustrates a large flame augmented when the type of object is recognized as the bottle, and FIG. 17C illustrates that the size of the fire special effect appears differently according to the type and the positions of the cup and bottle depending on the recognition of the type and the positions of the objects.

In this way, when the program grasps the augmented 3D position and label value of the recognized object, various interactions in the augmented reality are possible. In addition, the actual size of the object (target) may be approximately calculated by using the size of the bounding box through the object size calculation unit 220. The weight of the object may be calculated by using the actual size of the object through the weight estimation model 230. Based on the size and weight of the object, the augmented special effect through the special effect control unit 240 may be realistically expressed on the recognized object in the 3D space.

As a further example, the present disclosure proposes an example of how the above-described data and augmented reality technology may be combined through a manufactured firefighting robot.

Figure 18A:
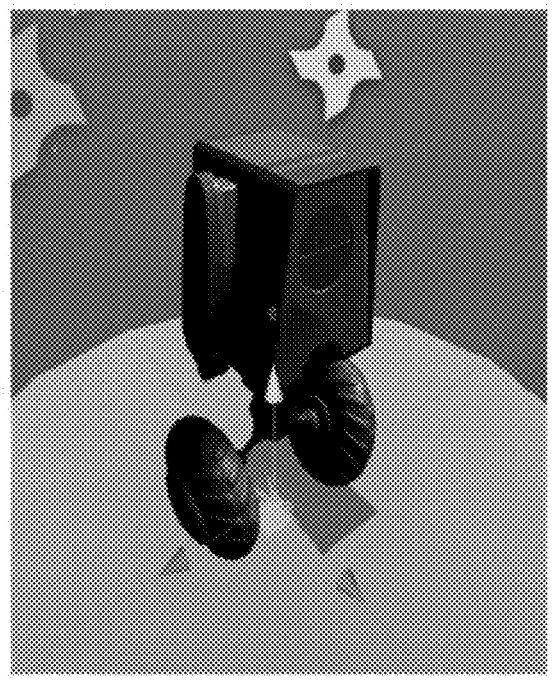
FIGS. 18A, 18B, and 18C are an exemplary diagram of a firefighting robot using a game engine.
Figure 18B:
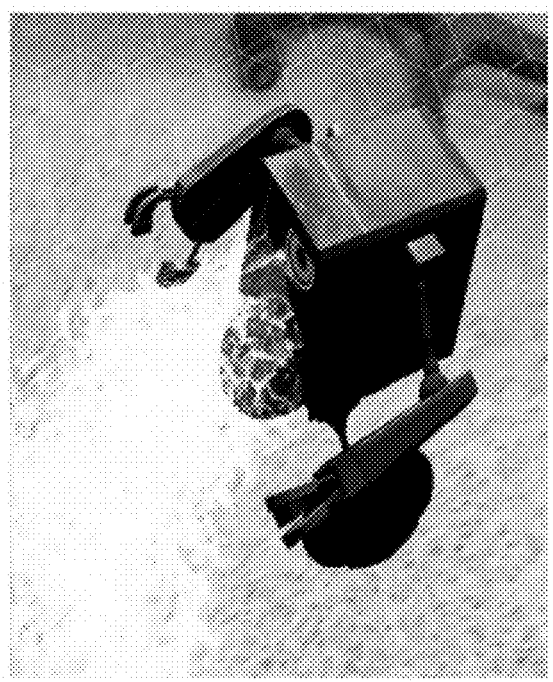
Figure 18C:
Figure 19:
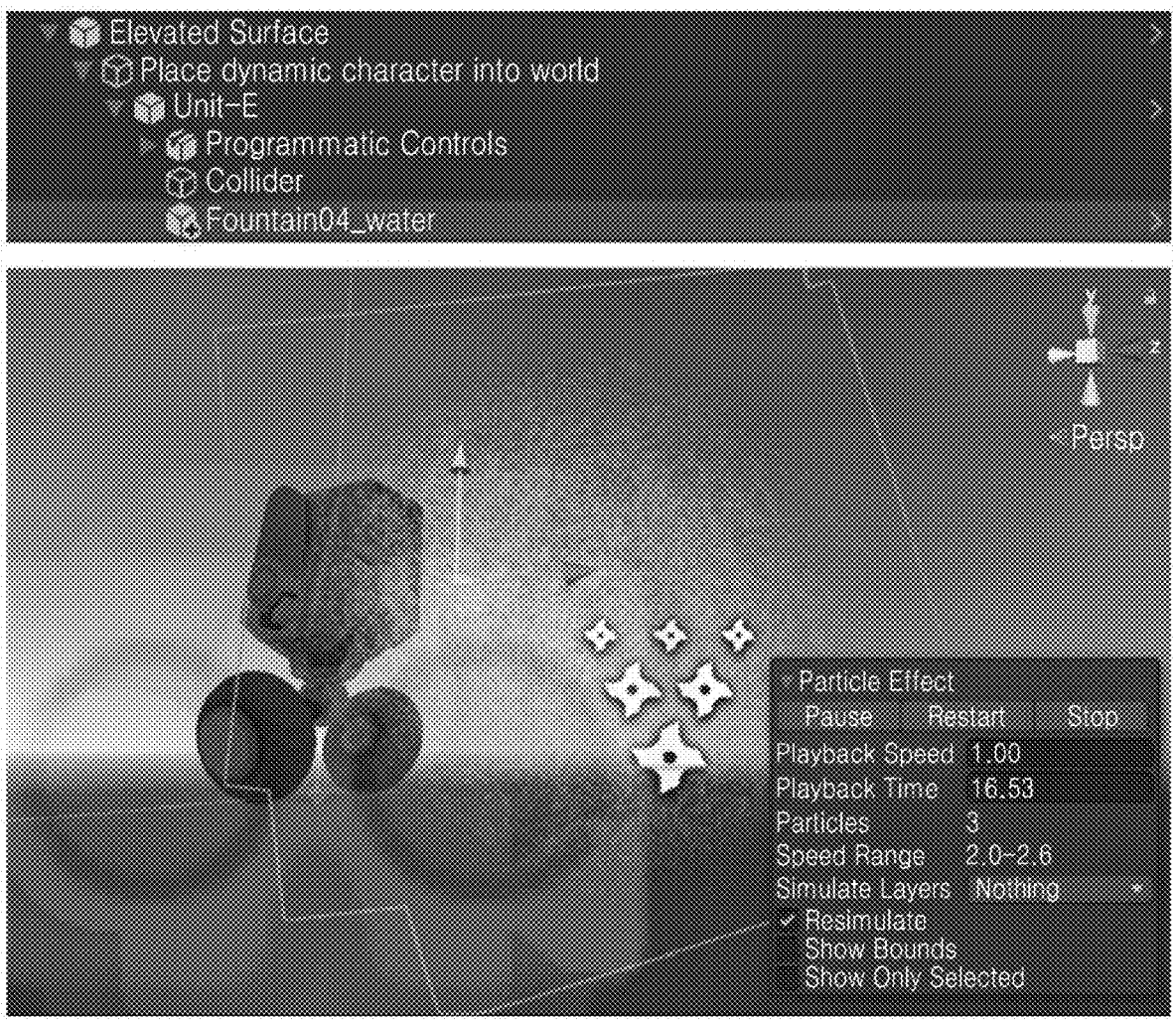
FIG. 19 illustrates an example of implementation of the firefighting robot through the attribution of a special effect of a water outlet of a game engine.

FIGS. 18A, 18B, and 18C are an exemplary diagram of the firefighting robot using a game engine, and FIG. 19 illustrates an example of implementation of the the firefighting robot through the attribution of a special effect of a water outlet of the game engine.

The present disclosure may apply various functions provided by the augmented reality through the label name and 3D coordinate values via the object recognition. Exemplarily, the firefighting robot capable of extinguishing the augmented fire special effect may be provided by utilizing the firefighting robot (illustrated in FIG. 18A) provided as the virtual object in the game engine. It may be applied to move on a plane that may be tracked by using the firefighting robot object. By using the touch interface, the coordinates touched by Raycast are made so that the firefighting robot moves on the horizontal surface in real time, thereby enabling interaction between the user and the augmented reality to which the firefighting robot is applied. In addition, the function of the game engine allows the firefighting robot to move around and extinguish the fire in the augmented reality.

For example, for directing like a firefighter extinguishing fire, a special effect of a water stream coming out of a front portion where the water outlet of the firefighting robot (illustrated in FIG. 18B) was set was expressed. The relevant water special effect may also intuitively adjust the width and intensity of the water stream arbitrarily through the game engine.

For example, when the firefighting robot (illustrated in FIG. 18C) encounters fire, it may be expressed as extinguishing the fire. It is possible to recognize the collision between the fire fighting robot and flames through the function of detecting the encounter between the fire fighting robot and the augmented special effect, that is, the collision of the game engine. That is, when a main body of the firefighting robot collides with the flame, the flame may be set to be destroyed. Through this, object recognized by the transfer learning may interact with the function unique to the augmented reality.

FIGS. 20A to 21D illustrate an example of an intelligent special effect of the apparatus for creating intelligent special effects based on object recognition according to an example of the present disclosure.

Figure 20A:
FIGS. 20A, 20B, 20C, and 20D illustrate an example of an intelligent special effect of the apparatus for creating intelligent special effects based on object recognition according to an example of the present disclosure.
Figure 20B:
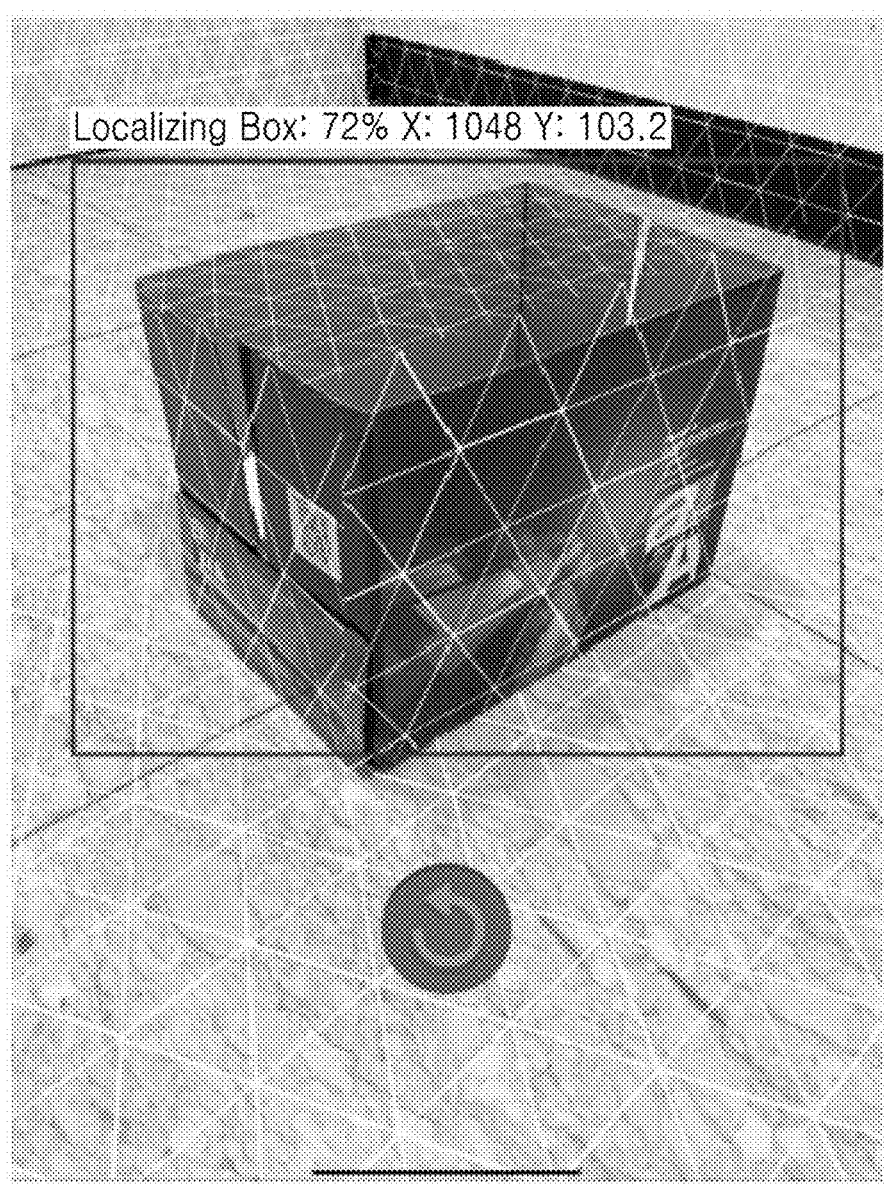
Figure 20C:
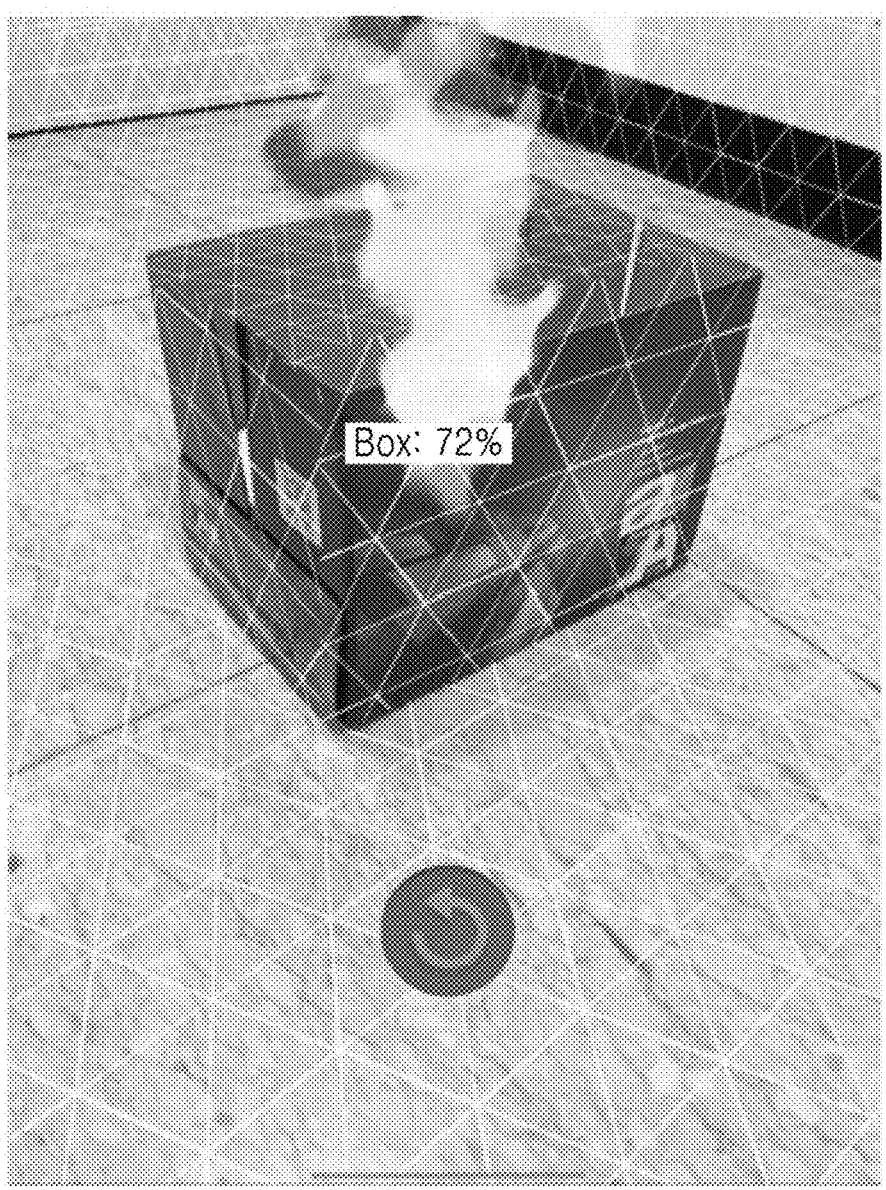
Figure 20D:
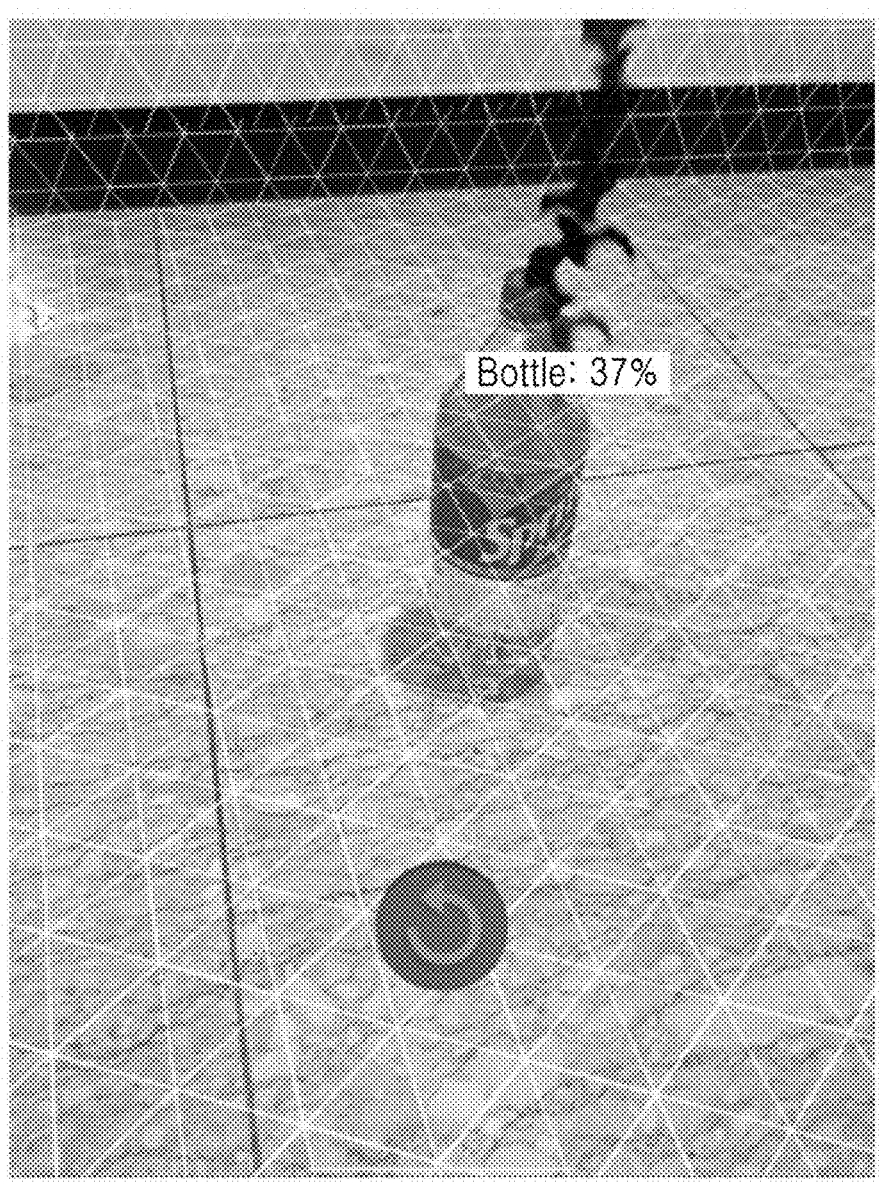
Figure 21A:
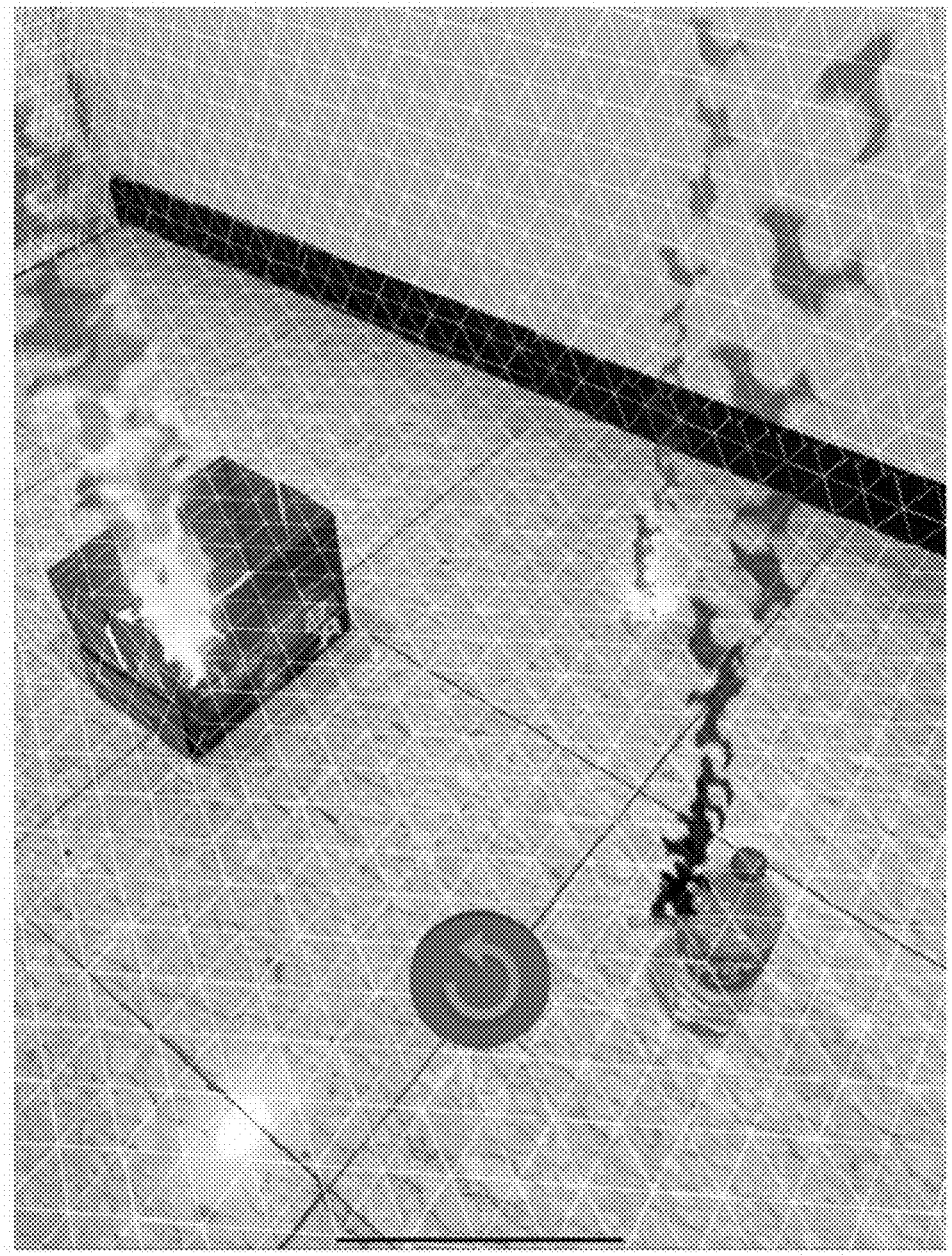
FIGS. 21A and 21B illustrate an example of an intelligent special effect of the apparatus for creating intelligent special effects based on object recognition according to an example of the present disclosure.
Figure 21B:
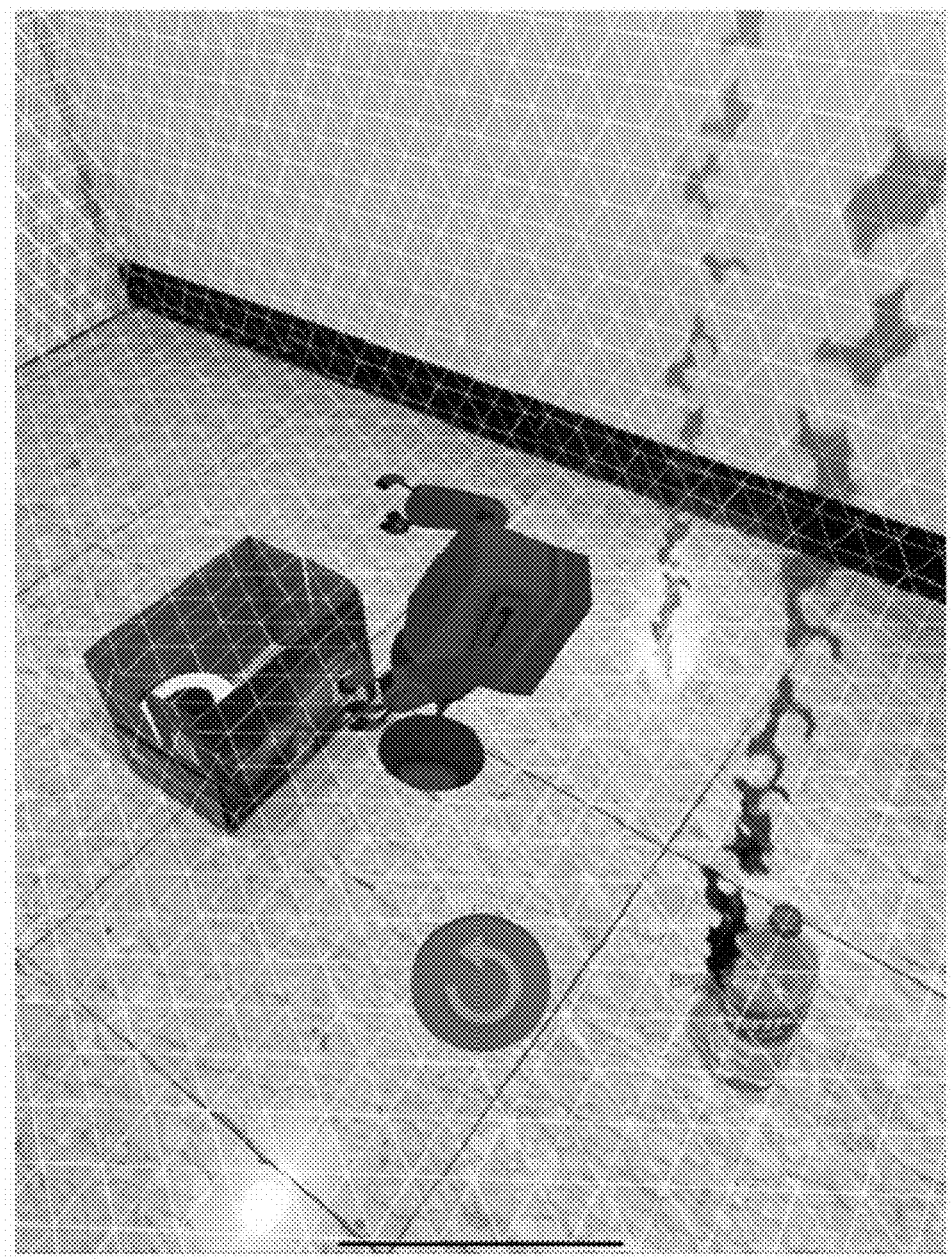

As illustrated, developers may apply various scenarios through interaction in the augmented reality. Referring to FIG. 20A, a flame may start from a cigarette butt inadvertently discarded in a paper cup. Since the recognized paper cup is a burning substance, a small fire special effect may be created on the coordinates at the moment of recognizing as the paper cup. Referring to FIGS. 20B and 20C, right next to the paper cup is a paper box, which is also a burning substance, and the fire is transferred to the paper box. The approximate size of the box may be calculated through the size of the bounding box, and depending on the size of the box, a larger or smaller fire may be displayed. Referring to FIG. 20D, the plastic bottle right next to the paper cup is not engulfed in flames, but may be seen slowly melting, giving off poisonous-looking black smoke. Referring to FIG. 21A, it may be seen that the three augmented fire special effects are augmented at different locations with different sizes, intensities, and shapes. Referring to FIG. 21B, the firefighting robot capable of moving around in the augmented reality based on touch is called into the augmented reality world to solve the situation. The firefighting robot may extinguish the fire when colliding with the fire special effect, and the flame may appear as a state of being extinguished.

The method described above may be implemented in the form of a recording medium including instructions executable by a computer, such as program modules executed by a computer. Computer readable media may be any available media that may be accessed by a computer and includes both volatile and nonvolatile media, and removable and non-removable media. Also, computer readable media may include computer storage media. The computer storage media includes both volatile and nonvolatile, and removable and non-removable media implemented in any method or technology for storage of information such as computer readable instructions, data structures, program modules or other data.

Those skilled in the art to which the present disclosure pertains will be able to understand that it may be easily modified into other specific forms without changing the technical spirit or essential features of the present disclosure based on the above description. Therefore, the examples described above should be understood as illustrative in all respects and not limiting. The scope of the present disclosure is indicated by the following claims, and all changes or modifications derived from the meaning and scope of the claims and equivalent concepts should be interpreted as being included in the scope of the present disclosure.

What is claimed is:

1. An apparatus for creating intelligent special effects based on object recognition comprising:
a communication module for receiving a photographed video of an object;
a memory storing a program for creating special effect information from the received video; and
a processor for executing the program stored in the memory,
wherein the program inputs an object video acquired from a camera to an object recognition model and extracts an object image to which an attribute of each object is matched,
weight information of each object is derived by inputting size information of the object image for each attribute of each object to a weight estimation model, and
special effect control information mapped to each object is determined based on the weight information for each attribute of each object,
wherein in the weight estimation model, a multi-regression model is constructed for each attribute of each object so that the weight information of each object is output by taking actual horizontal and vertical length information of each object calculated by the program as an input.

2. The apparatus for creating intelligent special effects based on object recognition of claim 1,
wherein the object recognition model is built based on training data in which each object image identified from an object video including a preset object and an attribute of each object is labeled,
depth information to each object acquired from a depth camera is learned through transfer learning to convert 2D coordinates of the object image into 3D coordinates of augmented reality, and
each object image is an image cut to a size of a bounding box formed to fit each object.

3. The apparatus for creating intelligent special effects based on object recognition of claim 2,
wherein the program calculates size information of a view frustum based on depth information to each object, and calculates the actual horizontal and vertical length information of each object based on the size information of the view frustum and the size information of the object image.

4. The apparatus for creating intelligent special effects based on object recognition of claim 1,
wherein the program performs control such that as the weight information for each attribute of each object increases, size, intensity, and duration of a fire special effect increase.

5. A method for creating intelligent special effects by an apparatus based on object recognition, the method comprising:
 (a) inputting an object video acquired from a camera to an object recognition model and extracting an object image to which an attribute of each object is matched;
 (b) inputting size information of the object image for each attribute of each object into a weight estimation model and deriving weight information of each object; and
 (c) determining special effect control information that is mapped to each object based on weight information for each attribute of each object,
 wherein in the weight estimation model, a multi-regression model is constructed for each attribute of each object so that the weight information of each object is output by taking actual horizontal and vertical length information of each object calculated in step (b) as an input.

6. The method for creating intelligent special effects of claim 5,
 wherein the object recognition model is built based on training data in which each object image identified from an object video including a preset object and an attribute of each object is labeled,
 depth information to each object acquired from a depth camera is learned through transfer learning to convert 2D coordinates of the object image into 3D coordinates of augmented reality, and
 each object image is an image cut to a size of a bounding box formed to fit each object.

7. The method for creating intelligent special effects of claim 6,
 wherein the step (b) includes calculating size information of a view frustum based on depth information to each object, and calculating the actual horizontal and vertical length information of each object based on the size information of the view frustum and the size information of the object image.

8. The method for creating intelligent special effects of claim 5,
 wherein the step (c) performs control such that as the weight information for each attribute of each object increases, size, intensity, and duration of a fire special effect increase.

* * * * *